(12) United States Patent
Dong et al.

(10) Patent No.: US 12,741,459 B2
(45) Date of Patent: Sep. 22, 2026

(54) MULTI-PLY LAMINATION SYSTEM

(71) Applicant: The Boeing Company, Arlington, VA (US)

(72) Inventors: Shuonan Dong, Seattle, WA (US); Austin B. Ball, Mercer Island, WA (US); Alan Scott Locke, Federal Way, WA (US); Asher Seth Einhorn, Seattle, WA (US); Brice Aaron Johnson, Toledo, WA (US)

(73) Assignee: The Boeing Company, Arlington, VA (US)

( * ) Notice: Subject to any disclaimer, the term of this patent is extended or adjusted under 35 U.S.C. 154(b) by 238 days.

(21) Appl. No.: 18/450,921

(22) Filed: Aug. 16, 2023

(65) Prior Publication Data

US 2025/0058557 A1 Feb. 20, 2025

(51) Int. Cl.
*B32B 38/18* (2006.01)
*B32B 5/12* (2006.01)
(Continued)

(52) U.S. Cl.
CPC .............. *B32B 38/185* (2013.01); *B32B 5/12* (2013.01); *B32B 37/18* (2013.01);
(Continued)

(58) Field of Classification Search
CPC ......... B32B 38/185; B32B 5/12; B32B 37/18; B32B 38/0004; B32B 38/1808;
(Continued)

(56) References Cited

U.S. PATENT DOCUMENTS 5,290,386 A 3/1994 Trudeau
8,007,894 B2 8/2011 Taggart
(Continued)

FOREIGN PATENT DOCUMENTS

CN 1742283 A 3/2006
DE 102022104989 A1 * 9/2022 ............ B25J 9/1697
WO 2015152331 A1 10/2015

OTHER PUBLICATIONS

Szarski et al., "An Unsupervised Defect Detection Model for a Dry Carbon Fiber Textile," Journal of Intelligent Manufacturing, vol. 33, 2022, pp. 2075-2092. https://doi.org/10.1007/s10845-022-01964-7.
(Continued)

*Primary Examiner* — George R Koch
(74) *Attorney, Agent, or Firm* — Yee & Associates, P.C.

(57) ABSTRACT

A method forms a multi-ply laminate. A first cutting system cuts and moves a first group of courses into staging positions. Placement robots pick up and place the first group of courses from the staging positions to a layup surface to form a first ply of the multi-ply laminate, changing an orientation of fibers from an initial orientation to a desired orientation for the first ply. A second cutting system cuts and moves a second group of courses into the staging positions while the placement robots are picking up and placing the first group of courses. The placement robots pick up and place the second group of courses from the staging positions to the layup surface to form a second ply of the multi-ply laminate after the first ply has been formed, changing the orientation of the fibers from the initial orientation to the desired orientation for the second ply.

23 Claims, 13 Drawing Sheets

(51) Int. Cl.
*B32B 37/18* (2006.01)
*B32B 38/00* (2006.01)
*B32B 41/00* (2006.01)

(52) U.S. Cl.
CPC ...... *B32B 38/0004* (2013.01); *B32B 38/1808* (2013.01); *B32B 41/00* (2013.01); *B32B 2038/1891* (2013.01); *B32B 2260/023* (2013.01); *B32B 2260/046* (2013.01); *B32B 2305/076* (2013.01); *B32B 2605/18* (2013.01)

(58) Field of Classification Search
CPC ............ B32B 41/00; B32B 2038/1891; B32B 2260/023; B32B 2260/046; B32B 2305/076; B32B 2605/18; B29C 70/38; B29C 70/382; B29C 70/384; B29C 70/386; B29C 70/388; B29C 70/545
See application file for complete search history.

(56) References Cited

U.S. PATENT DOCUMENTS 10,197,987 B2 2/2019 Battles et al.
10,710,318 B2 7/2020 Stone et al.
10,801,836 B2 10/2020 Humfeld et al.
10,814,480 B2 10/2020 Georgeson et al.
10,850,489 B2 12/2020 Metschan
11,472,139 B2 10/2022 Suriyaarachchi et al.
2013/0306233 A1* 11/2013 Pini ...................... B29C 70/543 156/256
2016/0200054 A1 7/2016 Kismarton
2017/0190077 A1 7/2017 George et al.
2018/0326621 A1* 11/2018 Martin ................ B29C 66/9512
2018/0339469 A1* 11/2018 Stone .................... B29C 70/202
2020/0283171 A1* 9/2020 Holmes .............. G01N 21/8422
2022/0153435 A1* 5/2022 Smith ..................... B64C 3/182
2022/0153444 A1 5/2022 Smith et al.
2022/0176649 A1* 6/2022 Krajca .................... B29C 70/38
2023/0173748 A1 6/2023 Johnson et al.

OTHER PUBLICATIONS

European Patent Office Extended Search Report, dated Nov. 18, 2024, regarding Application No. EP24175343.3, 10 pages.
Machine translation CN1742283A (Year: 2006).
Office Action dated Jun. 22, 2026, regarding U.S. Appl. No. 18/435,891, 41 pages.

* cited by examiner 302
304
344
312
342
313
317
330
310
332
311
360
353
315
351
350
352
340
321
320
300

FIG. 3

1600
AIRCRAFT
1602
AIRFRAME
INTERIOR
1606
SYSTEMS
PROPULSION SYSTEM
ELECTRICAL SYSTEM
1608
1612
1610
1614
1604
HYDRAULIC SYSTEM
ENVIRONMENTAL SYSTEM

MULTI-PLY LAMINATION SYSTEM

BACKGROUND INFORMATION

1. Field

The present disclosure relates generally to composite manufacturing and in particular, to multi-ply lamination of elongate composite parts.

2. Background

Aircraft are being designed and manufactured with greater and greater percentages of composite materials. Composite materials are used in aircraft to decrease the weight of the aircraft. This decreased weight can improve performance features such as payload capacity and fuel efficiency. Further, composite materials provide longer service life for various components in an aircraft.

Composite materials can be tough, light-weight materials created by combining two or more functional components. For example, a composite material can include reinforcing fibers bound in a polymer resin matrix, such as a carbon fiber reinforced polymer (CFRP). The fibers can be unidirectional, such as a tape or a tow, or can be multidirectional, such as a woven cloth or fabric. The fibers and resins can be arranged and cured to form a composite structure.

Using composite materials to create aerospace composite structures can allow for portions of an aircraft to be manufactured in larger pieces or sections. For example, a fuselage in an aircraft can be created in cylindrical sections to form the fuselage of the aircraft. Other examples include, without limitation, wing components joined to form a wing or stabilizer components joined to form a stabilizer.

In manufacturing composite structures, layers of composite material can be laid up on a tool. The layers of composite material may include fibers in sheets. These sheets can take the form of, for example, without limitation, fabrics, tape, tows, or other suitable configurations for the sheets. In some cases, resin can be infused or pre-impregnated into the sheets. These types of sheets are commonly referred to as prepreg.

The different layers of prepreg can be laid up in different orientations and different numbers of layers can be used depending on the desired thickness of the composite structure being manufactured. These layers can be laid up by hand or using automated lamination equipment such as tape laminating machines or fiber placement systems.

After the different layers have been laid up on the tool, the layers can be consolidated and cured upon exposure to temperature and pressure, thus forming the final composite structure.

SUMMARY

An embodiment of the present disclosure provides a multi-ply lamination system that comprises a first cutting system, a second cutting system, placement robots, and a controller. The first cutting system and the second cutting system are each configured to independently cut materials having fibers oriented in an initial orientation to form courses and to move the courses into staging positions. The controller is in communication with the first cutting system, the second cutting system, and the placement robots. The controller is configured to control the first cutting system to cut and move a first group of courses into the staging positions. The controller is configured to control the placement robots to pick up and place the first group of courses from the staging positions to a layup surface to form a first ply of a multi-ply laminate, changing an orientation of the fibers from the initial orientation to a desired orientation for the first ply. The controller is configured to control the second cutting system to cut and move a second group of courses into the staging positions while the placement robots are picking up and placing the first group of courses. The controller is configured to control the placement robots to pick up and place the second group of courses from the staging positions to the layup surface to form a second ply of the multi-ply laminate, after the first ply has been formed, changing the orientation of the fibers from the initial orientation to the desired orientation for the second ply.

Another embodiment of the present disclosure provides a multi-ply lamination system that comprises a first cutting system, second cutting system, placement robots, an automated tape layup machine, and a controller. The first cutting system and the second cutting system are each configured to independently cut materials having fibers oriented in an initial orientation to form courses and move those courses into staging positions. The automated tape layup machine is positioned to place a material having fibers in the initial orientation onto the layup surface. The controller is in communication with the first cutting system, the second cutting system, the placement robots, and the automated tape layup machine. The controller is configured to control the first cutting system to cut and move a first group of courses into the staging positions. The controller is configured to control the placement robots to pick up and place the first group of courses from the staging positions to a layup surface to form a first ply of a multi-ply laminate, changing an orientation of the fibers from the initial orientation to a desired orientation for the first ply. The controller is configured to control the second cutting system to cut and move a second group of courses into the staging positions while the placement robots are picking up and placing the first group of courses. The controller is configured to control the placement robots to pick up and place the second group of courses from the staging positions to the layup surface to form a second ply of the multi-ply laminate, after the first ply has been formed, changing the orientation of the fibers from the initial orientation to the desired orientation for the second ply. The controller is configured to control the automated tape layup machine to place the material to form a ply of the multi-ply laminate, with the ply having the fibers oriented in the initial orientation.

Yet another embodiment of the present disclosure provides a method of forming a multi-ply laminate. A first cutting system is controlled to cut and move a first group of courses into staging positions. Placement robots are controlled to pick up and place the first group of courses from the staging positions to a layup surface to form a first ply of the multi-ply laminate, changing an orientation of fibers from an initial orientation to a desired orientation for the first ply. A second cutting system is controlled to cut and move a second group of courses into the staging positions while the placement robots are picking up and placing the first group of courses. The placement robots are controlled to pick up and place the second group of courses from the staging positions to the layup surface to form a second ply of the multi-ply laminate after the first ply has been formed, changing the orientation of the fibers from the initial orientation to the desired orientation for the second ply. An automated tape layup machine is controlled to place a material to form a third ply of the multi-ply laminate with the third ply having the fibers oriented in the initial orientation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a schematic diagram of an inspection system in accordance with an illustrative embodiment;

DETAILED DESCRIPTION

Figure 1:
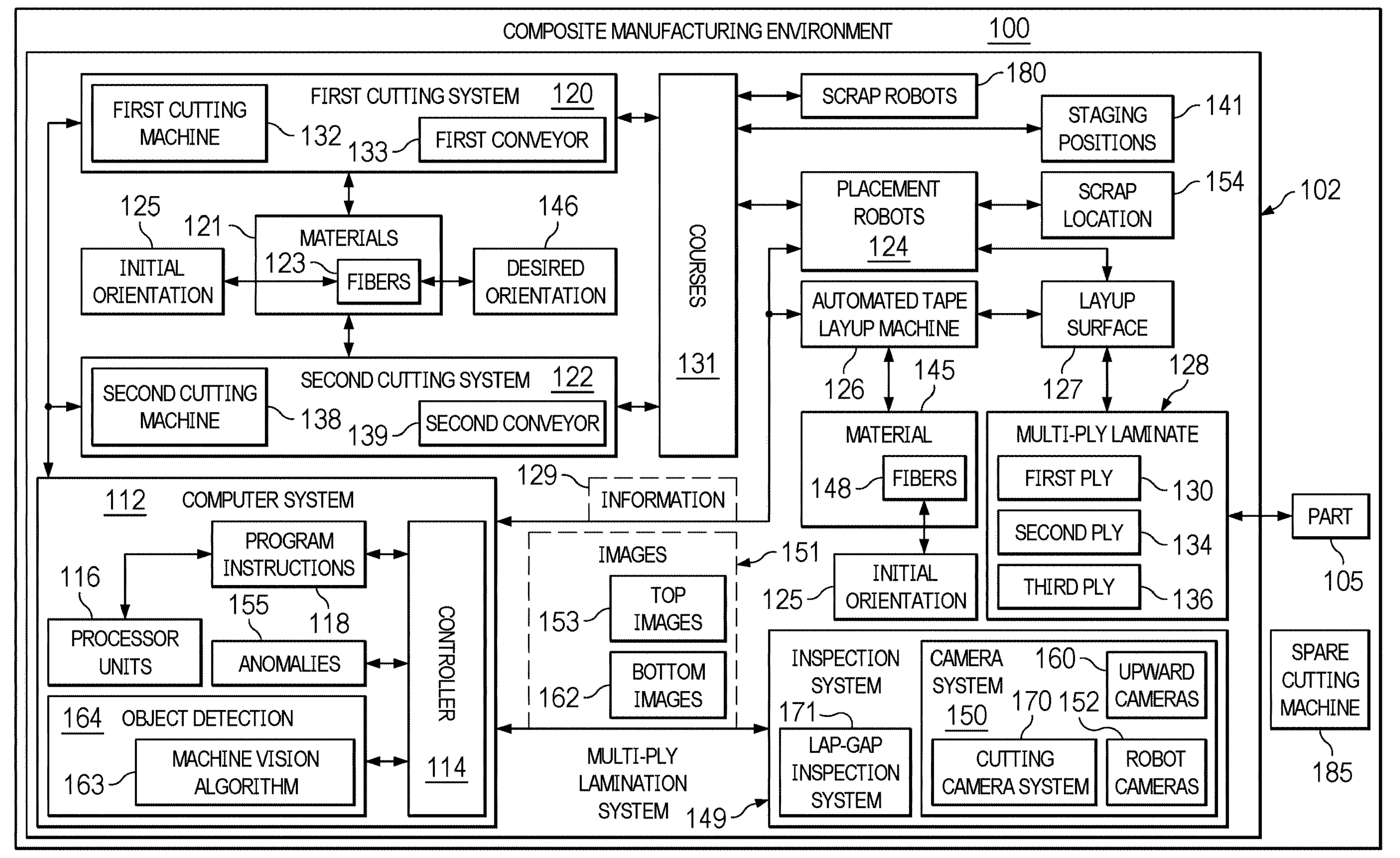
FIG. 1 is an illustration of a block diagram of a composite manufacturing environment in accordance with an illustrative embodiment.

The illustrative embodiments recognize and take into account one or more different considerations. For example, different illustrative embodiments recognize and take into account that increasing the speed at which composite parts can be fabricated is an important factor in manufacturing aircraft. Speed of forming multi-ply laminates is often a limit for high rate production of elongate composite parts that are long and narrow. The process of forming multi-ply laminates for elongate composites parts such as wing or fuselage stringers can be especially inefficient and can form a bottleneck in the aircraft manufacturing process. The inefficiencies can arise because forming a multi-ply laminate often involves laying down individual layers in which the fibers are in different orientations.

As used herein, a course is a single piece of a cut material. A ply is a series of courses having the same fiber orientation that are laid up or placed next to each other.

Also, a sequence is comprised of all of the courses and plies in a given orientation. In a sequence, all of the plies that can be laid up together before an overall inspection is performed. This sequence can include plies of multiple fiber orientations. In some examples, a sequence can be where all of plies have the same fiber orientation.

Currently, traditional tape laminating machines cut and move the lamination head many times during the layup process. Further, rework and idle time also results in delays in the manufacturing of elongate composite parts such as wing stringers. As a result, the current lamination systems are idle for large amounts of time because of inspection and rework. Undesired amounts of idle time are also present for material loading and machine maintenance.

Thus, it would be desirable to have a method, apparatus, system, and computer program product that results in at least one of reducing time needed to place nonzero courses, reducing off-line inspection and rework, or avoiding material loading and maintenance downtime. As used herein, the phrase “at least one of,” when used with a list of items, means different combinations of one or more of the listed items can be used, and only one of each item in the list may be needed. In other words, “at least one of” means any combination of items and number of items may be used from the list, but not all of the items in the list are required. The item can be a particular object, a thing, or a category.

For example, without limitation, “at least one of item A, item B, or item C” may include item A, item A and item B, or item B. This example also may include item A, item B, and item C or item B and item C. Of course, any combination of these items can be present. In some illustrative examples, “at least one of” can be, for example, without limitation, two of item A; one of item B; and ten of item C; four of item B and seven of item C; or other suitable combinations.

In one illustrative example, a multi-ply lamination system comprises a first cutting system, a second cutting system, placement robots, and a controller. The first cutting system and the second cutting system are each configured to independently cut materials having fibers oriented in an initial orientation to form courses, and to move the courses into staging positions. The controller is in communication with the first cutting system and the second cutting system and the placement robots. The controller is configured to control the first cutting system to cut and move a first group of courses into staging positions. The controller is configured to control the placement robots to pick up and place the first group of courses from the staging positions to a layup surface to form a first ply of a multi-ply laminate, changing the orientation of the fibers from the initial orientation to a desired orientation for the first ply. The controller is configured to control the second cutting system to cut and move a second group of courses into staging positions while the placement robots are picking up and placing the first group of courses. The controller is configured to control the placement robots to pick up and place the second group of courses from the staging positions to the layup surface to form a second ply of the multi-ply laminate, after the first ply has been formed, changing the orientation of the fibers from the initial orientation to the desired orientation for the second ply.

In this example and in other examples, the reference to "a first ply" refers to the first ply that is formed from the placement of courses to form multiple plies for the multi-ply laminate. This first ply is not necessarily the very first or very last ply in the multi-ply laminate being formed through placement of courses in forming plies.

With reference now to FIG. 1, an illustration of a block diagram of a composite manufacturing environment is depicted in accordance with an illustrative embodiment. As depicted, multi-ply lamination system 102 operates to create multi-ply laminate 128. In this example, multi-ply laminate 128 is used in a charge that is used to form part 105. Part 105 can be selected from a group comprising an elongate composite part, a wing stringer, a fuselage stringer, an empennage stringer, a floor beam, a wing spar, and an empennage spar. This part can be comprised completely of composite materials or can be a mix of composite materials with non-composite materials.

In this example, multi-ply lamination system 102 comprises a number of different components. As shown, multi-ply lamination system 102 comprises first cutting system 120, second cutting system 122, placement robots 124, automated tape layup machine 126, and controller 114.

As depicted, first cutting system 120 comprises first cutting machine 132 and first conveyor 133. Further in this example, second cutting system 122 comprises second cutting machine 138 and second conveyor 139.

In this example, first cutting system 120 and second cutting system 122 are each configured to independently cut materials 121 having fibers 123 oriented in an initial orientation 125 to form courses 131 and to move courses 131 into staging positions 141. Materials 121 can be, for example, carbon fiber fabric containing fibers 123. The material can be in the form of a fabric, tape, or some other form. In some illustrative examples, resin can be infused within materials 121. Further, materials 121 can be in the form of rolls.

In this example, staging positions 141 are positions from which courses 131 can be picked up by placement robots 124 and placed onto layup surface 127. In this example, staging positions 141 are positions on first conveyor 133 and second conveyor 139.

For example, in first cutting system 120, first cutting machine is configured to cut courses 131 and first conveyor 133 is configured to move courses 131 cut by first cutting machine 132 to staging positions 141 on first conveyor 133 with initial orientation 125. In second cutting system 122, second cutting machine 138 is configured to cut courses 131 and second conveyor 139 is configured to move courses 131 cut by second cutting machine 138 to staging positions 141 on second conveyor 139 with initial orientation 125. Further, wherein at least one of the first cutting machine 132 or second cutting machine 138 is configured to cut courses 131 from a roll of a material.

In this example, controller 114 is in communication with the first cutting system 120, the second cutting system 122, placement robots 124, automated tape layup machine 126. In this illustrative example, controller 114 can be implemented in software, hardware, firmware or a combination thereof.

When software is used, the operations performed by controller 114 can be implemented in program instructions configured to run on hardware, such as a processor unit. When firmware is used, the operations performed by controller 114 can be implemented in program instructions and data and stored in persistent memory to run on a processor unit. When hardware is employed, the hardware can include circuits that operate to perform the operations in controller 114.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 112 is a physical hardware system and includes one or more data processing systems. When more than one data processing system is present in computer system 112, those data processing systems are in communication with each other using a communications medium. The communications medium can be a network. The data processing systems can be selected from at least one of a computer, a server computer, a tablet computer, a programmable logic (PLC) controller, or some other suitable data processing system.

As depicted, computer system 112 includes a number of processor units 116 that are capable of executing program instructions 118 implementing processes in the illustrative examples. In other words, program instructions 118 are computer readable program instructions.

As used herein, a processor unit in the number of processor units 116 is a hardware device and is comprised of hardware circuits such as those on an integrated circuit that respond to and process instructions and program code that operate a computer.

When the number of processor units 116 executes program instructions 118 for a process, the number of processor units 116 can be one or more processor units that are in the same computer or in different computers. In other words, the process can be distributed between processor units 116 on the same or different computers in computer system 112.

Further, the number of processor units 116 can be of the same type or different type of processor units. For example, the number of processor units 116 can be selected from at least one of a single core processor, a dual-core processor, a multi-processor core, a general-purpose central processing unit (CPU), a graphics processing unit (GPU), a digital signal processor (DSP), or some other type of processor unit.

In this example, controller 114 controls first cutting system 120 to cut and move a first group of courses 131 into staging positions 141. In this example, first group of courses 131 is cut and moved by first cutting machine 132 onto first conveyor 133. Staging positions 141 for the first group of courses are on first conveyor 133.

Controller 114 controls placement robots 124 to pick up and place the first group of courses 131 from staging positions 141 to layup surface 127 to form first ply 130 of multi-ply laminate 128. In this example, placement robots 124 can be implemented using any suitable type of robot that can pick up courses 131 and place these courses onto layup surface 127. For example, placement robots 124 can be selected from at least one of a robotic arm, a gantry robot, a mobile robotic arm, and other suitable types of robot that can pick up courses from the cutting systems and place the courses onto layup surface 127.

In this example, layup surface 127 can be on or part of different types of objects. For example, layup surface 127 can be on a layup table. In another example, layup surface 127 can be on a layup conveyor. In yet another illustrative example, layup surface 127 can be located on a mobile or motorized cart.

As part of picking up and placing the first group of courses 131, placement robots 124 changes an orientation of fibers 123 from initial orientation 125 to desired orientation 146 for first ply 130, essentially, by re-orienting (i.e., rotating) the courses as they are carried from the staging positions 141 to the layup surface 127. For example, if the courses are cut from a roll of material in the form of broad goods, the fibers in the courses may initially be in an orientation aligned with the direction of the material as rolled (sometimes referred to as a 0 degree orientation), and then rotated by the placement robots and placed so that the fibers have a desired orientation 146, for example 45 degrees relative to the initial orientation. In this example, desired orientations for courses 131 are selected from a group consisting of 15 degrees, 30 degrees, 45 degrees, 60 degrees, 75 degrees, 90 degrees, and other orientations relative to initial orientation 125. Being relative to the initial orientation means that these degrees can be positive or negative values. The desired orientations can be determined from a design or other information specifying orientations for courses used to form multi-ply laminate 128.

Controller 114 also controls second cutting system 122 to cut and move a second group of courses 131 into staging positions 141 while placement robots 124 are picking up and placing the first group of courses 131. In this example, second group of courses 131 are cut and moved by second cutting machine 138 onto second conveyor 139. Staging positions 141 for the second group of courses 131 are on second conveyor 139.

In this example, these cutting machines can include one or more different types of cutters. For example, these cutting machines can include ultrasonic cutters, blade cutters, rotary cutters, and other suitable types of cutters. These cutters can cut material from a source such as broad goods on a roll, or otherwise at any desired angle. In this example, the desired angle is relative to the roll direction.

Further, controller 114 controls placement robots 124 to pick up and place the second group of courses 131 from staging positions 141 to layup surface 127 to form second ply 134 of multi-ply laminate 128 after first ply 130 has been formed. In this example, the movement of the picking up and placing of the first group of courses changes the orientation of fibers 123 from initial orientation 125 to desired orientation 146 for second ply 134. In this example, desired orientation 146 for first ply 130 can be different from desired orientation 146 for second ply 134.

In the illustrative example, placement robots 124 are configured to change the orientation of fibers 123 in at least one of the courses by re-orienting a course as it is picked up from a staging position and placed on layup surface 127 to form a ply. The ply has a width defined by exterior edges of the ply. A course can be re-oriented so that one or more cut edges of the course forms a part of an exterior edge of the ply when placed on layup surface 127.

Further in this example, automated tape layup (ATL) machine 126 is positioned to place a material 145 having fibers 148 in initial orientation 125 onto the layup surface 127. In this example, controller 114 controls automated tape layup machine 126 to place material 145 on layup surface 127 to form third ply 136 of multi-ply laminate 128 with third ply 136 having fibers 148 oriented in initial orientation 125. In some examples, automated tape layup machine 126 is configured to move along layup surface 127. With this example, the 0 degree layer can be a continuous piece of material laid down by automated tape layup machine 126 as this machine moves along layup surface 127.

In this illustrative example, the placement of courses and other materials onto layup surface 127 can be a placement of at least one of these courses or materials directly onto layup surface 127. In other words, at least one of the courses or materials can be in physical contact with layup surface 127. In the illustrative example, placement can also mean that the courses and materials are placed onto the layup surface with other courses and materials already being laid up on to layup surface 127.

For example, a ply can be placed onto layup surface 127 by placing the ply on top of another ply already placed on layup surface 127. In other words, the placement of a ply or material onto layup surface 127 does not mean that the ply material is placed in direct contact with layup surface 127.

In one non-limiting example, a first layer is at 45 degrees, a second layer is at −45 degrees, a third layer is at 90 degrees, and a fourth layer is laid down by automated tape layup machine 126 at 0 degrees. In this example, the 0 degree layer can be laid down continuously along the length of the layup by the automated tape layup machine 126 moving along or over layup surface 127.

In this illustrative example, controller 114 is in communication with first cutting system 120, second cutting system 122, placement robots 124, and automated tape layup machine 126 using information 129. In this example, controller 114 can send information 129 such as program code, commands, data, and other information used to control the operation of these components.

Additionally, multi-ply lamination system 102 can increase the speed and accuracy at which plies are laid up through integrated inspections that are performed as part of the process of picking up and placing courses 131. In one illustrative example, multi-ply lamination system 102 includes inspection system 149 that is configured to inspect courses 131. Inspection system 149 can comprise at least one of a camera system, a thermal camera, an infrared light camera, a visible light camera, a laser scanner, an x-ray imaging machine, a laser shearography system, or some other suitable inspection system.

In this example, inspection system 149 comprises camera system 150. In this example, camera system 150 is configured to generate images 151 of courses 131. Camera system 150 can be comprised of at least one of a thermal camera, an infrared light camera, a visible light camera, or some other suitable type of camera. Inspection system 149 can use other types of devices in addition to or in place of camera system 150. For example, inspection system 149 can include a laser scanning system, an x-ray system, a blue light sensor system, or other suitable sensor systems that can detect anomalies 155.

In this example, camera system 150 can be used to perform inspections of courses 131 cut by first cutting system 120 and second cutting system 122 prior to these courses being placed onto layup surface 127. This inspection can be performed to determine whether any of courses 131 have anomalies 155 that are out of tolerance.

Anomalies 155 can be at least one of foreign debris (FOD), wrinkles, pockets, imperfections, frayed edges, inconsistencies in the material, or other types of anomalies in courses 131. In this example, the tolerance for anomalies 155 can be based on manufacturing standards, design tolerances, regulations, industry standards, government regulations, and other sources. This type of inspection can reduce rework or other issues that can occur from laying up courses with anomalies.

In one illustrative example, camera system 150 includes robot cameras 152 connected to placement robots 124. Robot cameras 152 are positioned to generate top images 153 of a top surface of courses 131 as cut by first cutting system 120 and second cutting system 122. These inspections can be performed with courses 131 moving to or in staging positions 141.

A robot camera in robot cameras 152 can be connected to or in any location near an end effector of a robotic arm for placement robots or other robot. In one example, the robot camera can generate an image of the top surface of a course prior to picking up the course for placement.

In this example, controller 114 controls the generation of top images 153 of top surface of courses 131 in response to placement robots 124 moving to pick up courses 131. Controller 114 receives top images 153 and analyzes top images 153 for anomalies 155 that are out of tolerance. Controller 114 controls operation of placement robots 124 to move any of courses 131 having anomalies that are out of tolerance to scrap location 154.

Additionally, camera system 150 can include upward cameras 160 connected to camera stations. Camera stations can be any structure which upward cameras 160 can be connected to and positioned to generate bottom images 162. In this example, upward cameras 160 are positioned to generate bottom images 162 of a bottom surface of courses 131 held by placement robots 124.

With upward cameras 160, controller 114 controls the generation of bottom images 162 of the bottom surface of courses 131. In one illustrative example, bottom images 162 can be generated by upward cameras 160 in response to placement robots 124 moving courses 131 to upward cameras 160.

In this example, controller 114 analyzes bottom images 162 for anomalies 155 that are out of tolerance. Controller 114 controls placement robots 124 to move any courses 131 having anomalies 155 that are out of tolerance to scrap location 154.

In yet another example, camera system 150 can include cutting camera system 170. With this example, cutting camera system 170 is positioned to generate top images 153 of a top surface of courses 131 in response to first cutting system 120 and second cutting system 122 cutting courses 131.

With this example, controller 114 generates top images 153 of courses 131 using cutting camera system 170 in response to first cutting system 120 and second cutting system 122 cutting courses 131. Controller 114 analyzes top images 153 received from cutting camera system 170 for anomalies 155 that are out of tolerance. Controller 114 moves any courses 131 that have anomalies 155 that are out of tolerance to scrap location 154.

In this example, the movement of courses 131 from the cutting systems to scrap location 154 can be performed using robots other than placement robots 124 to increase the speed and efficiency at which multi-ply laminate 128 can be formed. In other examples, the conveyor can move courses 131 having anomalies 155 that are out of tolerance to scrap bin located at the end of the conveyor. In this case, those courses are not picked up by placement robots 124 for use in forming multi-ply laminate 128.

For example, multi-ply lamination system 102 can include a number of scrap robots 180 positioned to remove courses 131 cut by first cutting system 120 and second cutting system 122 with anomalies 155 that are out of tolerance to scrap location 154. Scrap robots 180 can be, for example, a robotic arm, a delta arm, a drone, or some other suitable type of robot. In yet other illustrative examples, cutting camera system 170 can also include cameras positioned to generate bottom images 162 of courses 131 cut by one of the cutting systems. This inspection can be performed prior to inspections using images 151 generated by robot cameras 152.

In this illustrative example, images 151 are analyzed by controller 114. The analysis can be performed using object detection 164 such as machine vision algorithm 163. This type of algorithm can perform image preprocessing, feature extraction, object detection, segmentation, classification, and recognition. The process implemented by machine vision algorithm 163 can identify specific objects or patterns or characteristics in images 151 that can be anomalies 155.

In another illustrative example, the inspection system 149 can include lap-gap inspection system 171 that is used after all courses in a ply are placed onto the layup surface 127. Lap-gap inspection system 171 can be used to measure gaps between courses 131. Lap-gap inspection system 171 can be connected to or in any location near an end effector of a robotic arm for placement robots or other robot. In this example, lap-gap inspection system 171 can comprise at least one of a laser profilometer, a camera, a thermal camera, an infrared light camera, a visible light camera, a laser scanner, an x-ray imaging machine, a laser shearography system, or some other suitable inspection system.

In this example, every other course in courses 131 is placed by placement robots 124 onto the layup surface 127 simultaneously, followed by the remaining courses 131, after which the robot uses its lap-gap inspection system to measure the gaps between courses.

In the illustrative example, a profilometer can be used to the gap width between adjacent courses. This tool can also be used to inspect the location of the overall ply boundary. This inspection can be for both interior boundary edges and boundary edges outside of the net trim line.

For example, placement robots 124 place all of the courses for the plies of a sequence. Placement robots 124 scan the nominal between-course gaps for all of courses using a profilometer and recording gap measurement data generated by the profilometer along the gap length. Further, the placement robots 124 scan the entire nominal border of all plies of the sequence with the profilometer. In this example, a single edge is detected with the profilometer and, in conjunction with robot tool center point (TCP) location data, the ply boundary location data can be determined.

With this example, if gap and boundary location measurements are within tolerance, layup continues with the next sequence. Otherwise, intervention can be performed to correct the tolerance error. The intervention can include course removal and restarting or replacing a course.

In yet another illustrative example, the efficiencies of forming multi-ply laminate 128 can be achieved using backup components. For example, multi-ply lamination system 102 can include spare cutting machine 185 that is used in response to one of first cutting machine 132 and the second cutting machine 138 needing maintenance. For example, the maintenance may be replacing a roll of material used to cut courses, replacing a blade, scheduled maintenance, or other maintenance operations.

Spare cutting machine 185 can be used in place of one of the cutting machines. The process can be a hot swap process in which starting and reinitializing the cutting process is not needed. In other words, spare cutting machine 185 can pick up where the prior cutting machine left off. In one example, controller 114 synchronizes operation of spare cutting machine 185 to cut courses 131 in response to swapping spare cutting machine 185 with a cutting machine in one of first cutting system 120 and second cutting system 122.

Further in the illustrative examples, when spare cutting machine 185 is hot swappable, interruptions in cutting and placing courses can be minimized. This hot swapping can be implemented using features or components that enable immediate mechanical alignment to the conveyor. For example, mechanisms for rapid connection of electrical and communication cables and automatic controller integration in the cutting systems can be used.

Thus, in one illustrative example, one or more solutions are present that overcome a problem with undesired times for laying up courses in manufacturing composite parts. As a result, one or more technical solutions can provide increased speed in laying out courses through using placement robots to simultaneously layup courses for a ply.

One or more illustrative examples enable increased efficiency in placing courses to form a ply with increased efficiency and speed as compared to current techniques used to lay up courses for composite parts such as those that may be long and narrow. The illustrative examples avoid moving a lamination head many times during a layout process as with current techniques. Further, manual inspections may be reduced or avoided through the use of cameras to generate images to analyze courses for anomalies that are out of tolerance.

In the illustrative examples, courses can be cut simultaneously while other (already-cut) courses are being placed by placement robots. Multiple cutting machines are present such that each cutting machine can cut courses for a particular orientation, and/or be synchronized with each other and/or the operations of the placement robots. The courses cut by each of the cutting machines have orientations based on the sequence of courses in a design for the composite part. As a result, once placement robots have completed placing courses in one orientation, for example to complete a ply of a multi-ply laminate, those placement robots can begin placing courses for the next orientation, for example to assemble the next ply of the multi-ply laminate, without waiting or delays.

In the illustrative examples, simultaneous placement of multiple courses can be performed using placement robots. Further, swapping of the equipment can be formed to reduce downtime when at least one of material loading or other maintenance is needed. In the illustrative examples, a charge lamination process can be reduced from 12 hours to one hour for wing stringers.

Further, inspections can be performed as courses are picked up for placement. These inspections are automatically performed and can reduce or avoid the need for manual inspections of the courses used to assemble the plies.

The illustration of composite manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, automated tape layup machine 126 can be an optional component and may be omitted from multi-ply lamination system 102 in some examples. As another example, one or more cutting systems in addition to first cutting system 120 and second cutting system 122 can be present for cutting courses 131. Further, placement robots 124 can be of the same type of robots or can be of different types of robots in the different illustrative examples. For example, a portion of placement robots 124 can be robotic arms in fixed locations while another portion of placement robots 124 can be mobile robotic arms that can move to different locations.

Figure 2:
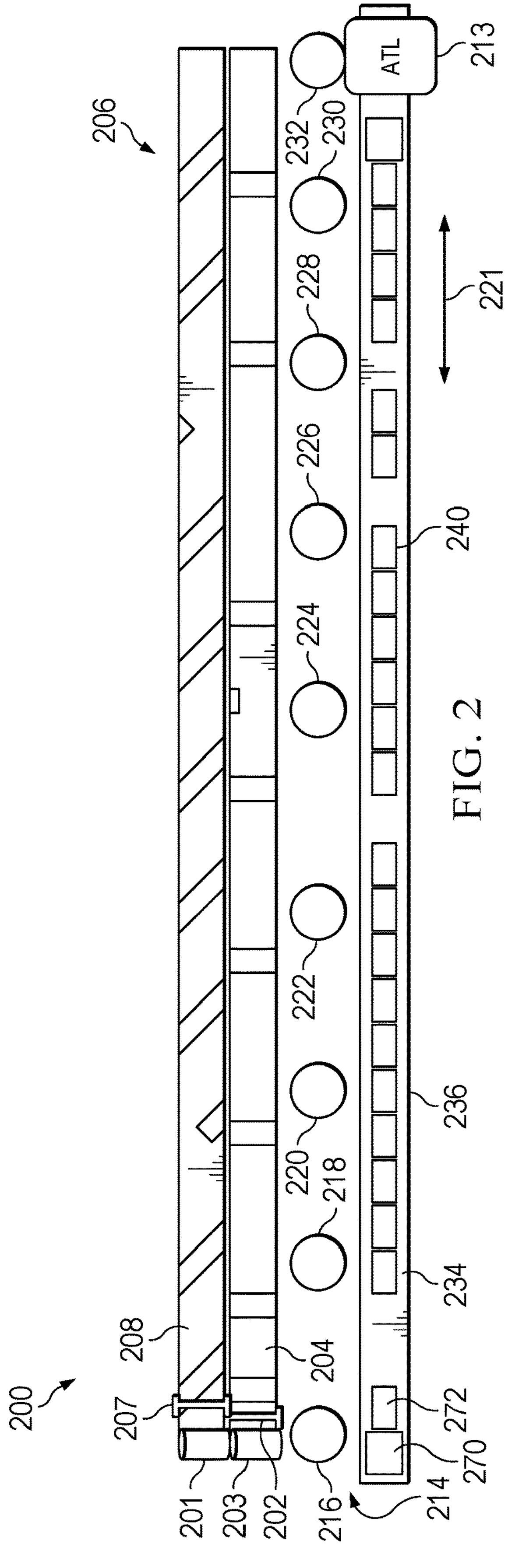
FIG. 2 is an illustration of a schematic diagram of a multi-ply layup in accordance with an illustrative embodiment.

With reference next to FIG. 2 an illustration of a schematic diagram of a multi-ply layup is depicted in accordance with an illustrative embodiment. Multi-ply lamination system 200 is an example of one implementation for multi-ply lamination system 102 in FIG. 1.

As depicted, multi-ply lamination system 200 has first cutting machine 202 that cuts material 203 to form courses 206 on first conveyor 204 that have an initial orientation. In this example, the material is in the form of broad goods on a roll, and the initial orientation is 0 degrees, with fibers in the direction shown by arrow 221. In other words, the fibers in the material are oriented in the direction that the material is rolled on the roll. These courses can be cut by first cutting machine 202 to have different sizes and shapes but have the same initial orientation.

Multi-ply lamination system 200 also has second cutting machine 207 that cuts material 201, also shown in this example to be in the form of broad goods on a roll, to form courses 206 on second conveyor 208, and also having the initial orientation. These courses can also have different sizes and shapes with the initial orientation. As depicted, first conveyor 204 and second conveyor 208 are parallel to each other.

In this example, multi-ply lamination system 200 also includes placement robots 214. As depicted, nine placement robots are present, placement robot 216, placement robot 218, placement robot 220, placement robot 222, placement robot 224, placement robot 226, placement robot 228, placement robot 230, and placement robot 232.

The location of first conveyor 204, second conveyor 208, and placement robots 214 are such that placement robots 214 can pick up courses 206 and place them onto layup surface 234 on conveyor 236. Also, the type and configuration of placement robots 214 are selected to be able to pick up courses 206 from first conveyor 204 and second conveyor 208 and place those courses onto layup surface 234 on conveyor 236 as part of forming plies such as ply 240. The location of first conveyor 204, second conveyor 208, and placement robots 214 are such that placement robots 214 can pick up courses 206 and place them onto layup surface 234 on conveyor 236.

In this example, multi-ply lamination system 200 also includes automated tape layup machine 213. This automated tape layup machine cuts courses having the initial orientation, which is 0 degrees in this example.

During operation of multi-ply lamination system 200, first cutting machine 202 cuts courses 206 that form an array of courses 206 on first conveyor 204. These courses are moved by first conveyor 204 into staging positions on first conveyor 204 relative to placement robots 214. When courses 206 have been cut and moved into staging positions on first conveyor 204, placement robots 214 pick up courses 206 from first conveyor 204 and place those courses onto layup surface 234 on conveyor 236.

As courses 206 are being picked up from first conveyor 204 and placed onto layup surface 234 by placement robots 214, second cutting machine 207 cuts courses 206 that move on second conveyor 208 to staging positions on second conveyor 208 relative to placement robots 214. The timing of cutting courses 206 by these cutting machines can be selected such that placement robots 214 always have courses 206 in staging positions that are ready for placement onto layup surface 234.

Once placement robots 214 have completed picking up and placing courses 206 from staging positions on first conveyor 204, placement robots 214 begin picking up courses 206 from staging positions on second conveyor 208 and placing courses 206 from those staging positions onto layup surface 234. In some examples, some of placement robots 214 can begin picking up and placing courses 206 from second conveyor 208 prior to other ones of placement robots 214 completing picking up and placing the first group of courses 206.

In this example, first cutting machine 202 begins cutting new courses once the first group of courses 206 has been picked up and placed onto layup surface 234. These new courses can be placed on layup surface 234 with same or different orientation from the orientation for courses 206 picked up from staging positions on second conveyor 208 and placed on layup surface 234. The orientations are selected based on design of the composite part that identifies orientations for courses that are placed to form plies for the composite part.

This process can repeat with courses being cut on alternate cutting machines and being placed by placement robots 214 onto layup surface 234. This placement can result in a multi-ply layup. This alternating cutting, picking up, and placing courses with desired orientations can increase the efficiency and speed at which plies and multi-layer plies can be laid up for a composite part. For example, a first layer can be laid up at 45 degrees, a second layer at −45 degrees, and a third layer is at 90 degrees. In this example, a fourth layer is laid down by automated tape layup machine 126 at 0 degrees. In this example, the 0 degree layer can be laid down continuously along the length of the layup by the automated tape layup machine 213 moving along or over layup surface 234.

In this example, when courses having a desired orientation that is the same as the initial orientation, such as 0 degrees, these courses can be placed on layup surface 234 using automated tape layup machine 213. Automated tape layup machine 213 can move in the direction of arrow 221 along conveyor 236. Automated tape layup machine 213 can provide increased performance and efficiency in laying up courses having an orientation of 0 degrees as compared to using placement robots 214 to layup courses with an orientation of 0 degrees.

In this depicted example, some courses can have wider width than other courses that optimize for tab outs. For example, course 270 is wider than course 272.

Illustration of multi-ply lamination system 200 is shown to illustrate one manner in which multi-ply lamination system 102 in FIG. 1 can be implemented. This illustration is not meant to limit the manner in which multi-ply lamination system 102 can be implemented. For example, automated tape layup machine 213 is an optional component and can be omitted in some implementations. When automated tape layup machine 213 is not present, the orientations for courses 206 can also include desired orientations that are the same as the initial orientations.

Figure 3:
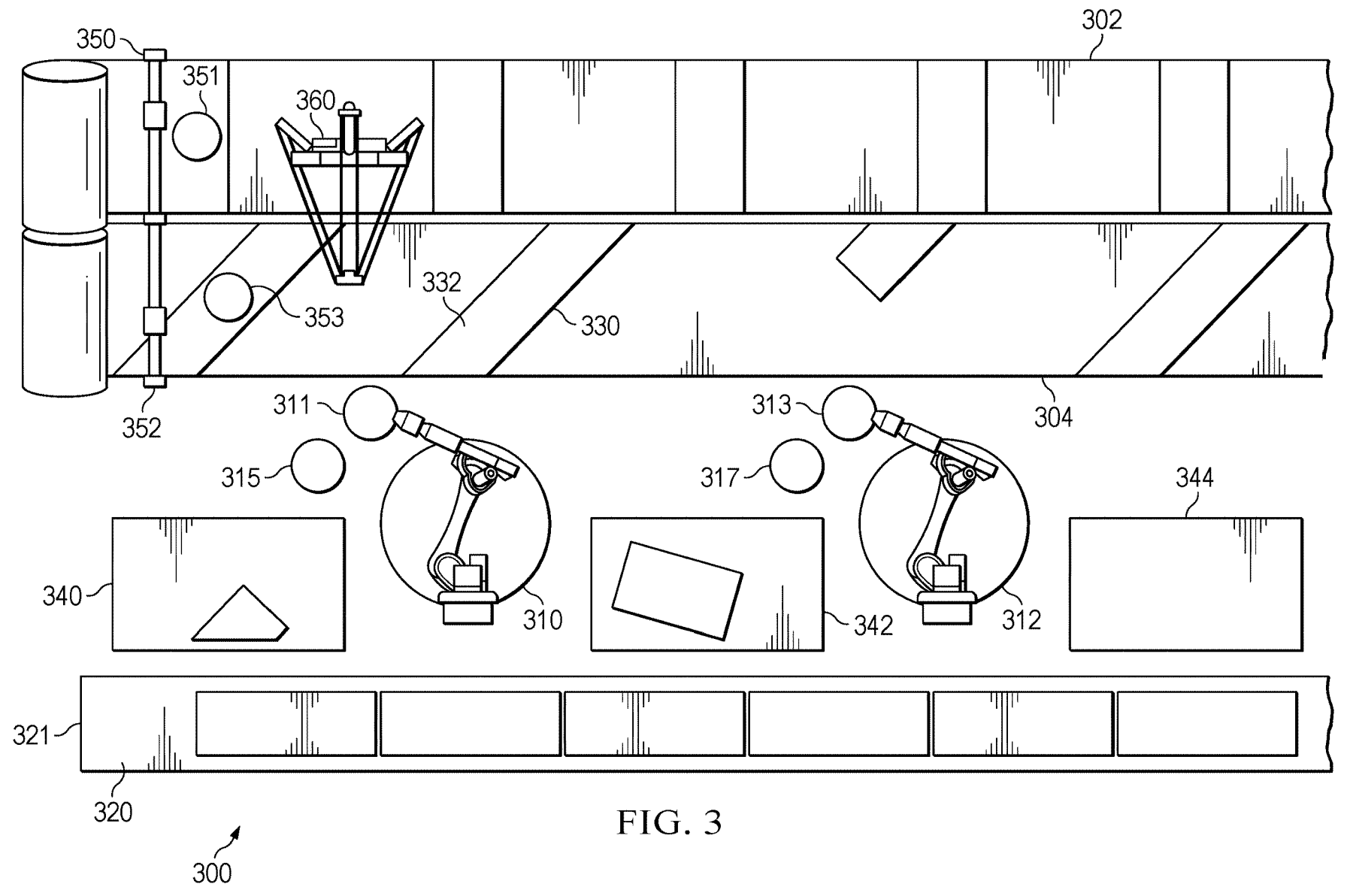

With reference next for FIG. 3, an illustration of a schematic diagram of an inspection system is depicted in accordance with an illustrative embodiment. In this example, inspection system 300 is an example of an implementation for inspection system 149 in FIG. 1. As depicted, inspection system 300 is comprised of cameras that are used at different steps in the process of cutting material to form courses and placing the courses to form a ply.

As depicted in this example, inspection system 300 comprises cameras that are positioned to generate images of courses for analysis during different times from cutting course to placing courses on a layup surface.

In this illustrative example, placement robot 310 has robotic camera 311 and placement robot 312 has robotic camera 313. These robotic cameras are connected to placement robots. When one component is "connected" to another component, the connection is a physical connection. For example, a first component, robotic camera 311, can be considered to be physically connected to a second component, placement robot 310, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

These robotic cameras can be used to generate images of the top surfaces of courses prior to or as part of the placement robots picking up courses for placement from either first conveyor 302 or second conveyor 304. The top surfaces of these images can be analyzed for anomalies that are out of tolerance on the top surfaces of the courses.

Additionally, inspection system 300 also includes upward cameras such as upward camera 315 and upward camera 317. Upward camera 315 is positioned to be within reach of placement robot 310. Upward camera 317 is positioned to be within reach of placement robot 312. In this illustrative example, these upward cameras are used to generate images of the bottom surfaces of courses that are picked up and held by the placement robots. These images can be analyzed to determine whether anomalies that are out of tolerance are present on the bottom surfaces of the courses.

For example, placement robot 310 can move to pick up course 330. This movement of placement robot 310 results in robotic camera 311 being positioned over course 330. Robotic camera 311 can generate an image of the top surface 332 of course 330. This image can be analyzed to determine whether one or more anomalies are present on the top surface 332 of course 330 that are out of tolerance.

If an anomaly is present on top surface 332 of course 330 that is out of tolerance, placement robot 310 picks up and places course 330 in scrap bin 340. If an anomaly that is out of tolerance is not present on top surface 332, placement robot 310 picks up course 330. Placement robot 310 moves course 330 into a position over upward camera 315. Upward camera 315 generates an image of the bottom surface (not shown) of course 330. This image is analyzed to determine whether an anomaly that is out of tolerance is present on the bottom surface of course 330. If an anomaly is present that is out of tolerance, course 330 is placed in scrap bin 340. If an anomaly that is out of tolerance is not present on the surface of course 330, placement robot 310 moves and places course 330 onto layup surface 320 of conveyor 321.

Placement robot 312 can generate images of top surfaces of courses using robotic camera 313 and images of bottom surfaces of courses using upward camera 317 for analysis to determine whether anomalies are present that are out of tolerance. In this example, placement robot 312 places courses with anomalies that are out of tolerance in scrap bin 342. In this example, scrap bin 344 can be used by placement robot 312 or another robot.

Additionally, inspections of courses can be performed prior to placement robots moving to pick up courses. For example, cutting machine 350 has cutting system camera 351 and cutting machine 352 has cutting system camera 353. In this example, cutting system camera 351 is connected to cutting machine 350, and cutting system camera 353 is connected to cutting machine 352.

These cutting system cameras can moved as the cutting machines move or can move independently of the cutting machines to generate images of the top surfaces of courses cut by the cutting machines. These images can be analyzed for anomalies. In this example, anomalies can also include the shape and dimensions of the courses in addition to anomalies that may be present on the surface of the courses. If an anomaly is present, scrap robot 360 picks up the course with anomalies and deposits that course into one of scrap bin 340, scrap bin 342, scrap bin 344, or any other scrap bin.

This analysis can be formed as the course is being cut or after the course has been cut. If an issue is identified with respect to the dimensions and the course as it is being cut, the cutter can cut the material to form an unfinished course that can be discarded. In this manner, reduced waste of materials such as fabrics or tape can occur. Further, inspecting courses prior to laying up the courses on a layup surface to form a ply can reduce the time and issues involved with finding inconsistencies later in processing the ply.

In another example, scrap robot 360 can be omitted. This example, one of placement robot 310 and placement robot 312 can be used in place of scrap robot 360. In another example, courses with anomalies that are out of tolerance remain on first conveyor 302 and second conveyor 304, and are moved to directly fall into a large scrap bin at the far end of the conveyors (not shown).

Figure 4:
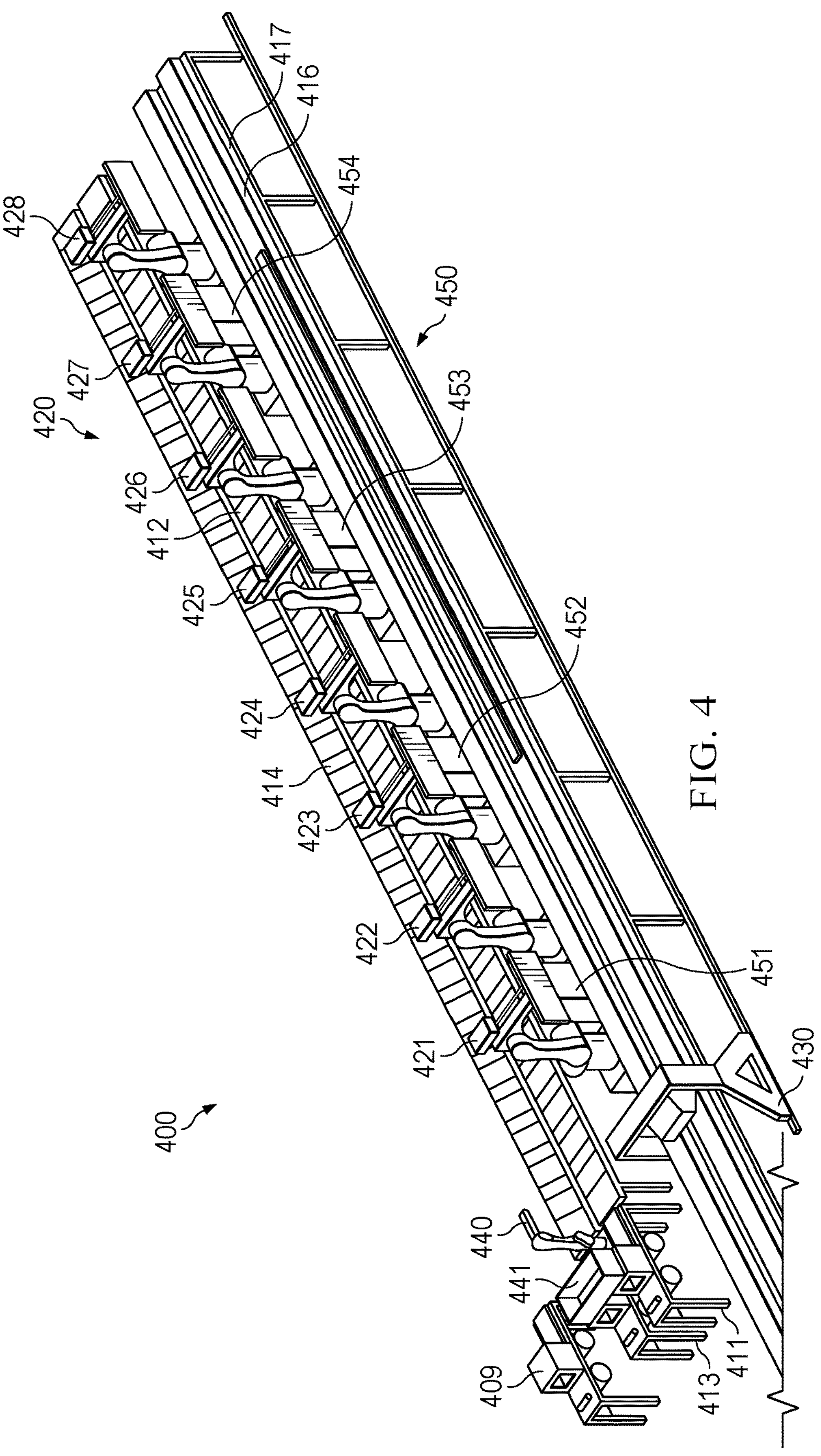
FIG. 4 is a pictorial illustration of a multi-ply lamination system in accordance with an illustrative embodiment.

With reference next to FIG. 4, a pictorial illustration of a multi-ply lamination system is depicted in accordance with an illustrative embodiment. Multi-ply lamination system 400 is an example of one implementation for multi-ply lamination system 102 shown in block form in FIG. 1.

Multi-ply lamination system 400 comprises first cutting machine 411 with first conveyor 412.

Additionally, second cutting machine 413 and second conveyor 414 are positioned parallel to first cutting machine 411 and first conveyor 412.

In this example, placement robots 420 include placement robot 421, placement robot 422, placement robot 423, placement robot 424, placement robot 425, placement robot 426, placement robot 427, and placement robot 428. In this example, placement robots 420 are robotic arms that can pick up courses in staging positions on both first conveyor 412 and second conveyor 414 and place those courses onto layup surface 416 on ply conveyor 417. Additionally, automated tape layup (ATL) machine 430 is positioned to move and lay up courses on layup surface 416.

Further, scrap robot 440 is located by first cutting machine 411 and second cutting machine 413. This scrap robot can place courses that have been cut incorrectly or have other types of anomalies into scrap bin 441.

Further in this example, scrap bins 450 are present for use by placement robots 420. Scrap bins 450 includes scrap bin 451, scrap bin 452, scrap bin 453, and scrap bin 454. Placement robots 420 can include cameras used to inspect courses that placement robots 420 moved to pick up. Courses with anomalies that are out of tolerance can be placed into scrap bins 450 by placement robots 420.

Further in this example, spare cutting machine 409 can be hot swapped with first cutting machine 411 or second cutting machine 413. This hot swapping can be performed to allow continuous cutting and positioning of courses as needed to provide placement robots 420 with a continuous supply of courses to form plies on layup surface 416.

Figure 5:
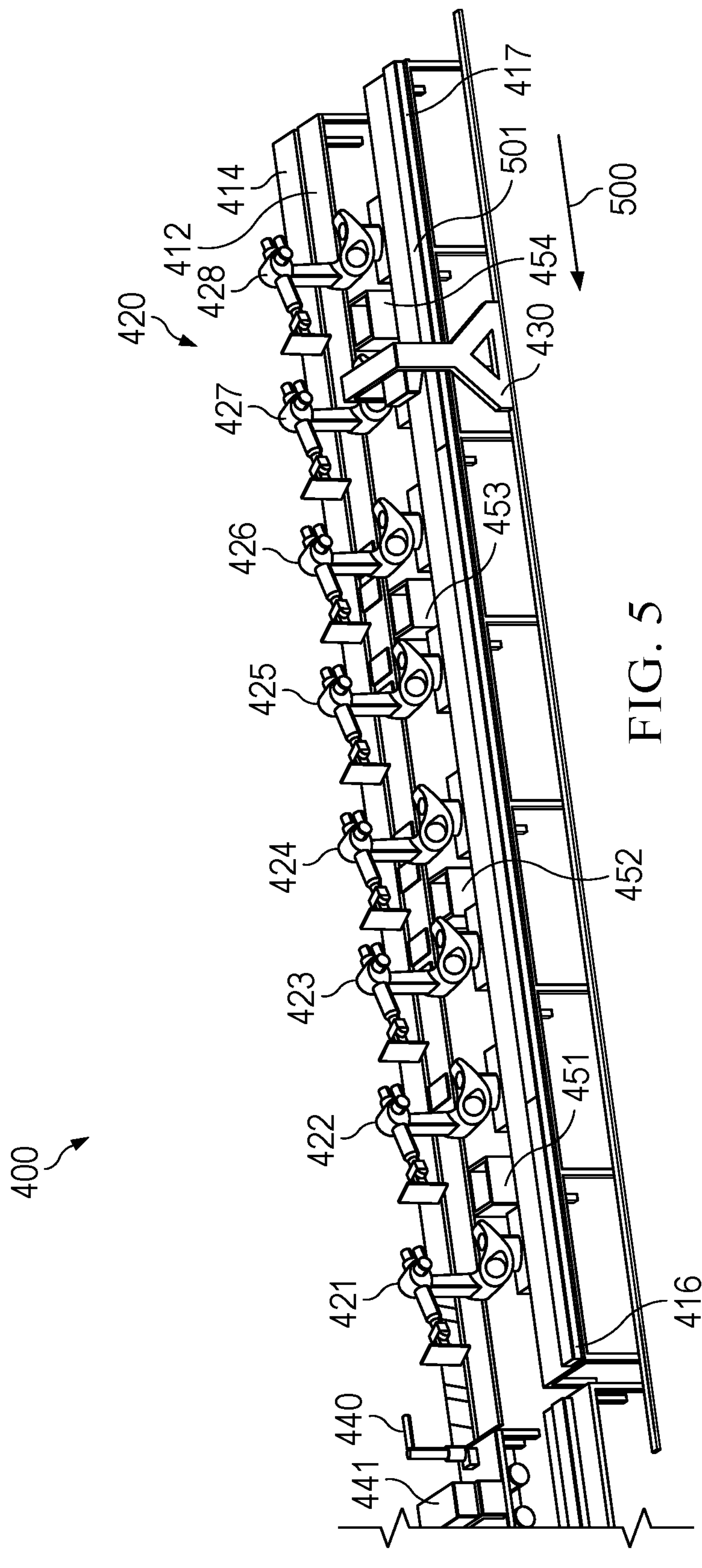
FIG. 5 is a pictorial illustration of a layup of a course by an automated tape layup machine in a ply layup system in accordance with an illustrative embodiment.
Figure 6:
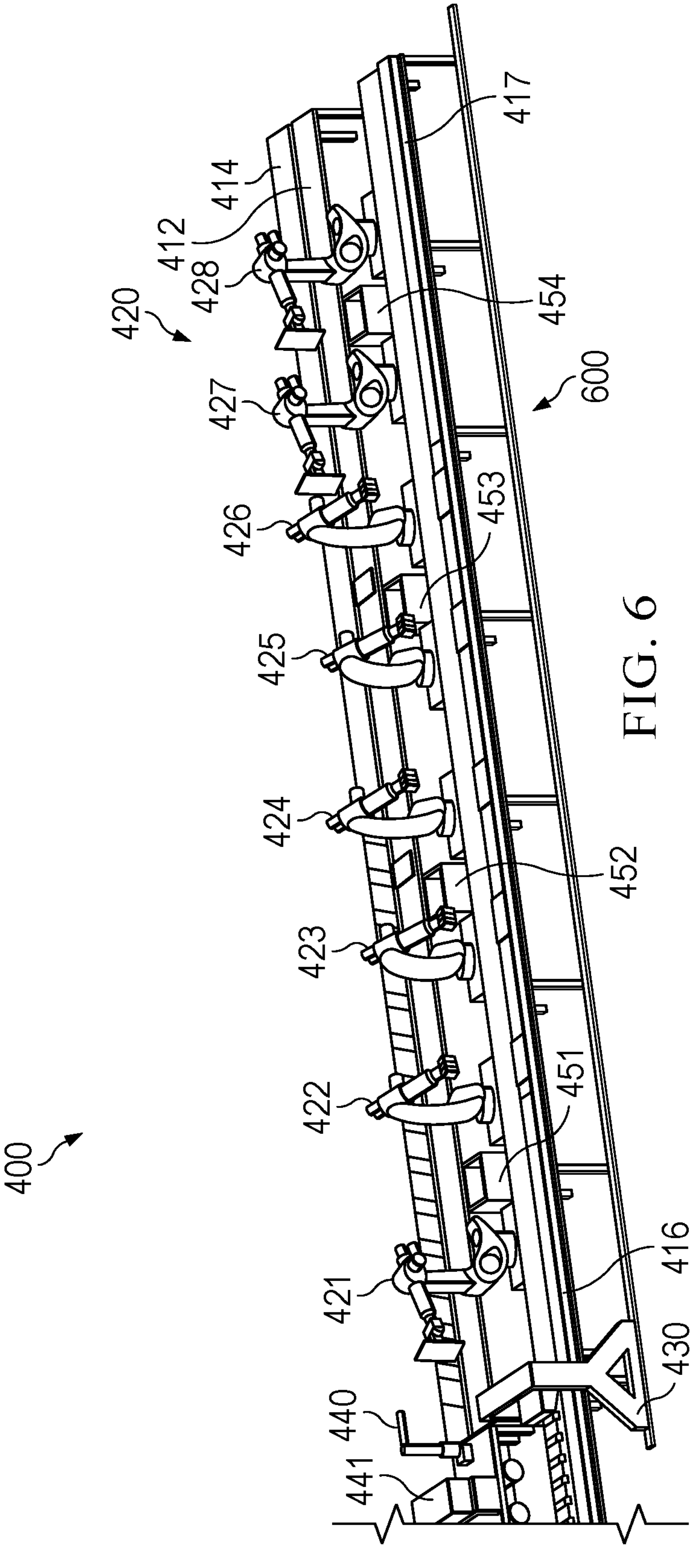
FIG. 6 is a pictorial illustration of a layup of courses by placement robots in a ply layup system in accordance with an illustrative embodiment.
Figure 7:
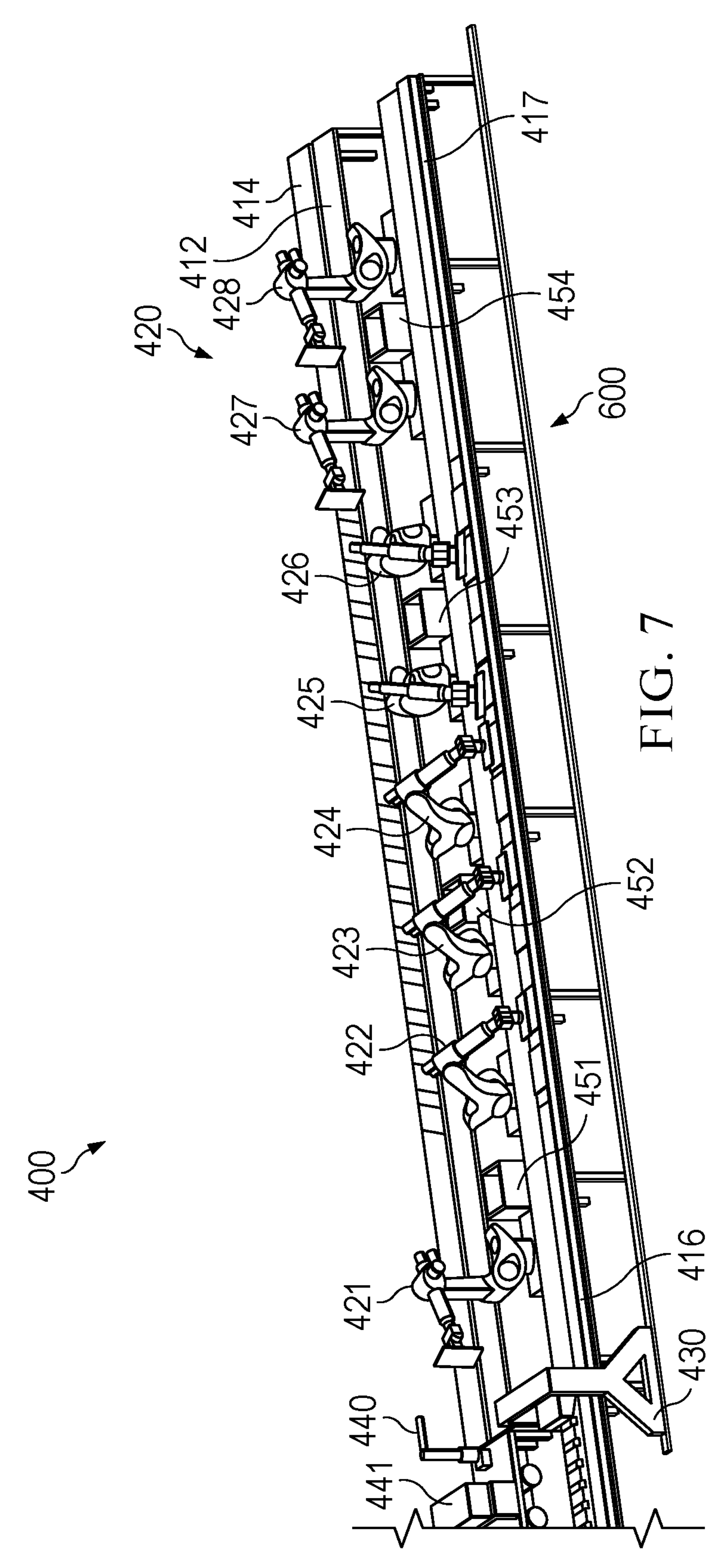
FIG. 7 is a pictorial illustration of a layup of courses by placement robots in a ply layup system in accordance with an illustrative embodiment.

FIGS. 5-7 are pictorial illustrations of a process for laying up courses in accordance with an illustrative embodiment illustrate. With reference to FIG. 5, a pictorial illustration of a layup of a course by an automated tape layup machine in a ply layup system is depicted in accordance with an illustrative embodiment. As depicted, automated tape layup machine 430 moves in the direction of arrow 500 to lay up 0 degree course 501 on layup surface 416.

In FIG. 6, a pictorial illustration of a layup of courses by placement robots in a ply layup system is depicted in accordance with an illustrative embodiment. As depicted in this figure, placement robots 420 have picked up courses from first conveyor 412 and placed the courses onto layup surface 416 in staggered arrangement 600 with gaps. As illustrated, a gap is present at every other location.

In this figure, second cutting machine 413 is cutting courses that are moved by second conveyor 414 to staging positions on second conveyor 414 while placement robots 420 pickup courses from staging positions on first conveyor 412 for placement.

Turning next to FIG. 7, a pictorial illustration of a layup of courses by placement robots in a ply layup system is depicted in accordance with an illustrative embodiment. In this figure, placement robots 420 have picked up and placed courses from first conveyor 412 into the gaps in staggered arrangement 600 of the courses on layup surface 416.

In this illustrative example, placing the missing in-between courses can be performed when the robot vacuum chuck end effector is larger than the placed length of the course. Otherwise, If the robots attempted to simultaneously place directly adjacent courses, the end effectors of the placement robots can potentially collide.

At this point, placement robots 420 can utilize their onboard lap-gap inspection system to measure gaps between adjacent courses. For example, placement robots 420 can include measurement devices such as profilometers that can be used to perform gap assessment to ensure that adjacent courses are close enough to each other.

As depicted in this example, second cutting machine 413 has finished cutting courses that are now in staging positions on second conveyor 414. These courses are ready for placement robots 420 to pick up and place onto layup surface 416.

This cycle of course cutting and placement onto layup surface 416 can be performed until a multi-layer ply has been completed for a composite part. This process for laying up courses reduces idle time of placement robots 420 because placement robots 420 do not need to wait for new courses to become available for placement. Instead, placement robots 420 can continue to place courses that are picked up from positions on first conveyor 412 and second conveyor 414.

Further, inspections of courses can be performed prior to and after placement robots 420 pick up the course. Courses with anomalies outside of the tolerance can be discarded and new courses can be recut and placed in the positions for pickup and placement by placement robots 420.

The illustration of multi-ply lamination system 400 in FIGS. 4-7 is meant as one example for multi-ply lamination system 102 in FIG. 1. This illustration is not meant to limit the manner in which other illustrative examples can be implemented. For example, other numbers of placement robots can be used other than the eight placement robots depicted in this example. For example, four placement robots, 20 placement robots, or some other number placement robots can be used. Further, one or more cutting machines and conveyors can be used in addition to first cutting machine 411 with first conveyor 412 and second cutting machine 413 and second conveyor 414. These cutting machines and conveyors may be placed such that placement robots 420 can reach the courses cut by these conditions.

In another illustrative example, another set of placement robots, cutting machines, and conveyors can be positioned with a mirrored configuration on the opposite side of the layup surface 416 and conveyor 417. With this configuration, all of the placement robots can place courses onto the layup surface 416, coordinated by the controller 114.

In yet other illustrative examples, an inspection system may be omitted. Or inspections may be performed by placement robots 420 and not by the cutting machines. In yet other illustrative examples, one or more layup surfaces on conveyors may be present in addition to layup surface 416 on conveyor 417. With additional layup surfaces, placement robots 420 can place courses for multiple composite parts. Further, in other illustrative examples courses do not need to be placed in staggered positions onto layup surface 416.

Figure 8:
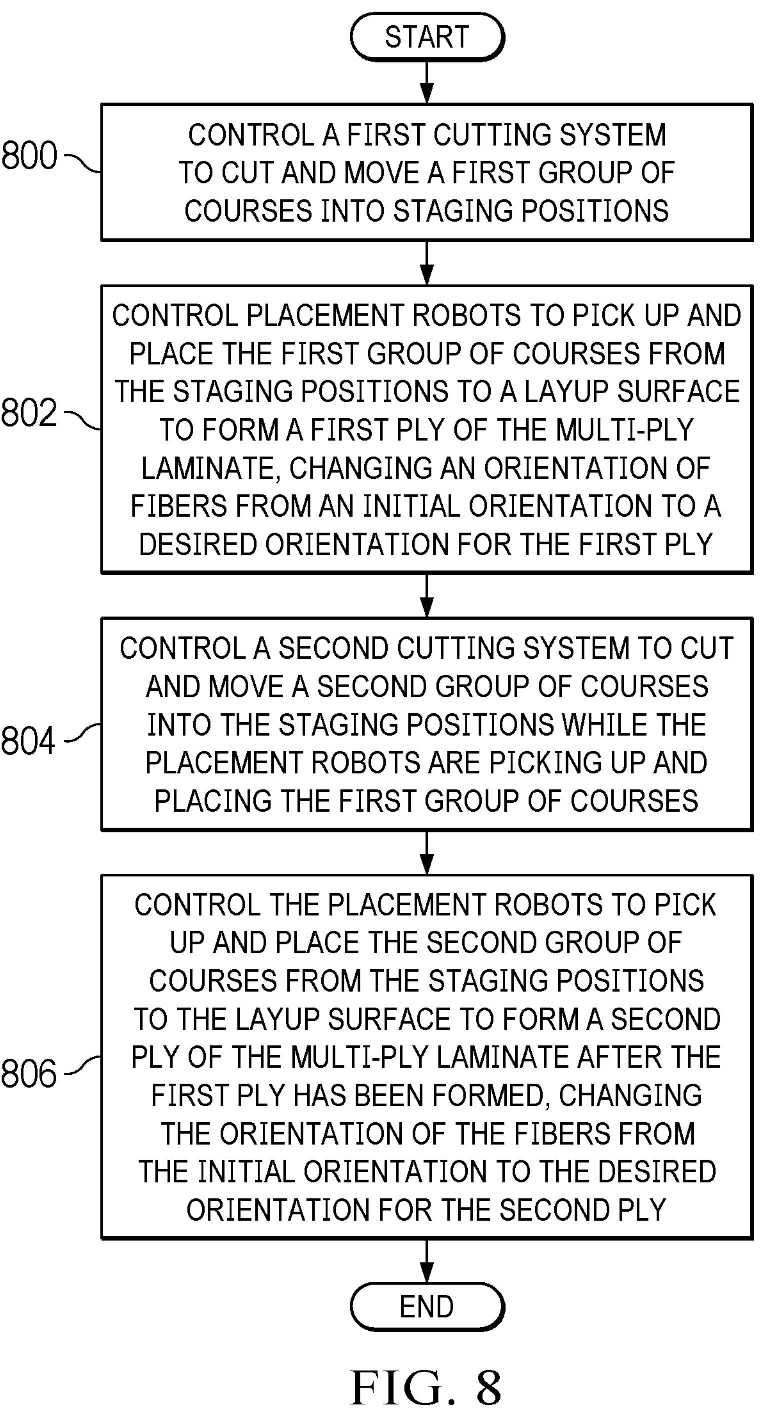
FIG. 8 is an illustration of a flowchart of a process for forming a multi-ply limited in accordance with an illustrative embodiment.

Turning next to FIG. 8, an illustration of a flowchart of a process for forming a multi-ply limited is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in controller 114 in computer system 112 in FIG. 1.

The process controls a first cutting system to cut and move a first group of courses into staging positions (operation 800). The process controls placement robots to pick up and place the first group of courses from the staging positions to a layup surface to form a first ply of the multi-ply laminate, changing an orientation of fibers from an initial orientation to a desired orientation for the first ply (operation 802).

The process controls a second cutting system to cut and move a second group of courses into the staging positions while the placement robots are picking up and placing the first group of courses (operation 804). The process controls the placement robots to pick up and place the second group of courses from the staging positions to the layup surface to form a second ply of the multi-ply laminate after the first ply has been formed, changing the orientation of the fibers from the initial orientation to the desired orientation for the second ply (operation 806). The process terminates thereafter.

In the example in the process in FIG. 8, each subsequent ply for the multi-ply laminate is formed by placing at least some of material of each subsequent ply to at least partially overlap a prior ply in the multi-ply laminate. Further, the orientation of the fibers in at least one of the courses is changed by re-orienting the course as it is picked up from a staging position and placed on the layup surface to form a ply. Also, the ply has a width defined by exterior edges of the ply. The course is re-oriented so that one or more cut edges of the course forms a part of an exterior edge of the ply when placed on the layup surface.

Figure 9:
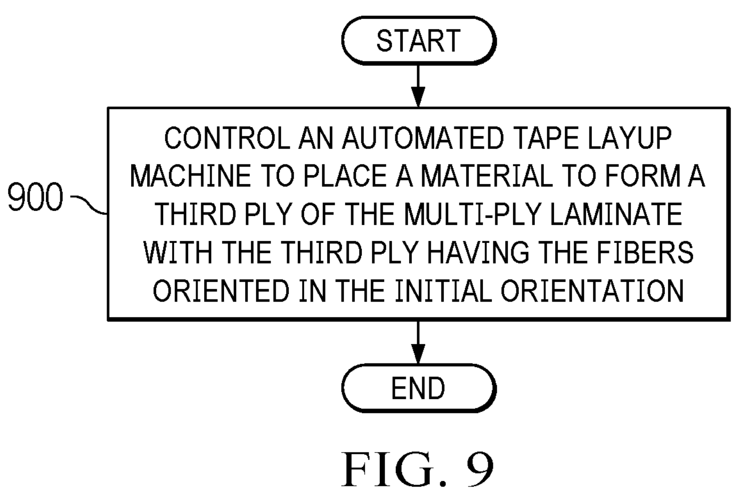
FIG. 9 is an illustration of a flowchart of a process for laying up a third ply in a multi-ply laminate in accordance with an illustrative embodiment.

Turning next to FIG. 9, an illustration of a flowchart of a process for laying up a third ply in a multi-ply laminate is depicted in accordance with an illustrative embodiment. The process illustrated in this figure is an example of an additional operation that can be performed with the operations in FIG. 8.

The process controls an automated tape layup machine to place a material to form a third ply of the multi-ply laminate with the third ply having the fibers oriented in the initial orientation (operation 900). The process terminates thereafter.

Figure 10:
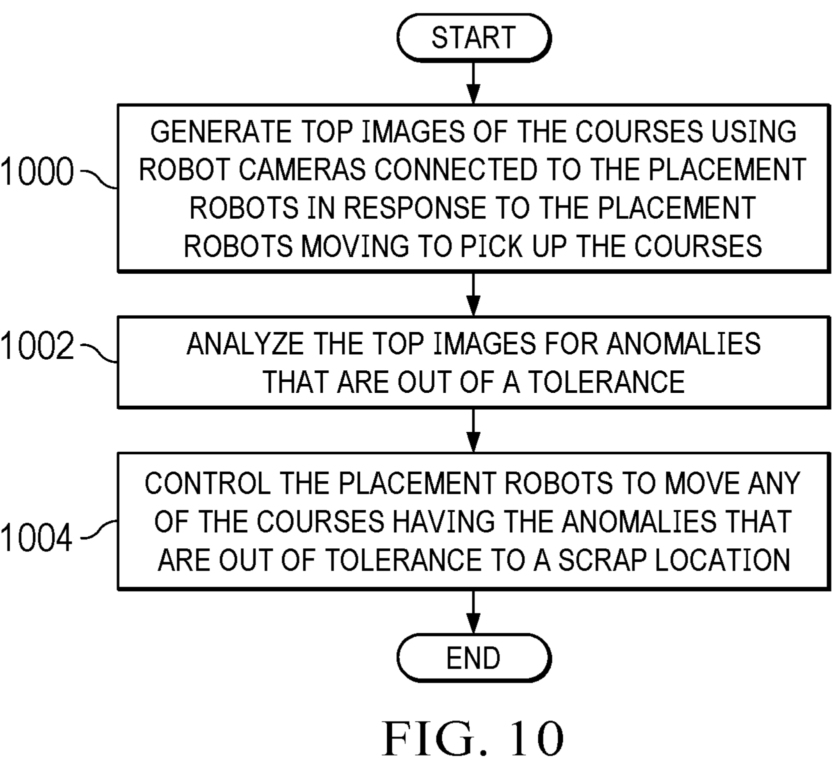
FIG. 10 is an illustration of a flowchart of a process for inspecting courses in accordance with an illustrative embodiment.

With reference now to FIG. 10, an illustration of a flowchart of a process for inspecting courses is depicted in accordance with an illustrative embodiment. The process in this figure is an example of an additional operation that can be performed with the operations in FIG. 8.

The process generates top images of a top surface of the courses using robot cameras connected to the placement robots in response to the placement robots moving to pick up the courses (operation 1000). The process analyzes the top images for anomalies that are out of a tolerance (operation 1002).

The process controls the placement robots to move any of the courses having the anomalies that are out of the tolerance to scrap location (operation 1004). The process terminates thereafter.

Figure 11:
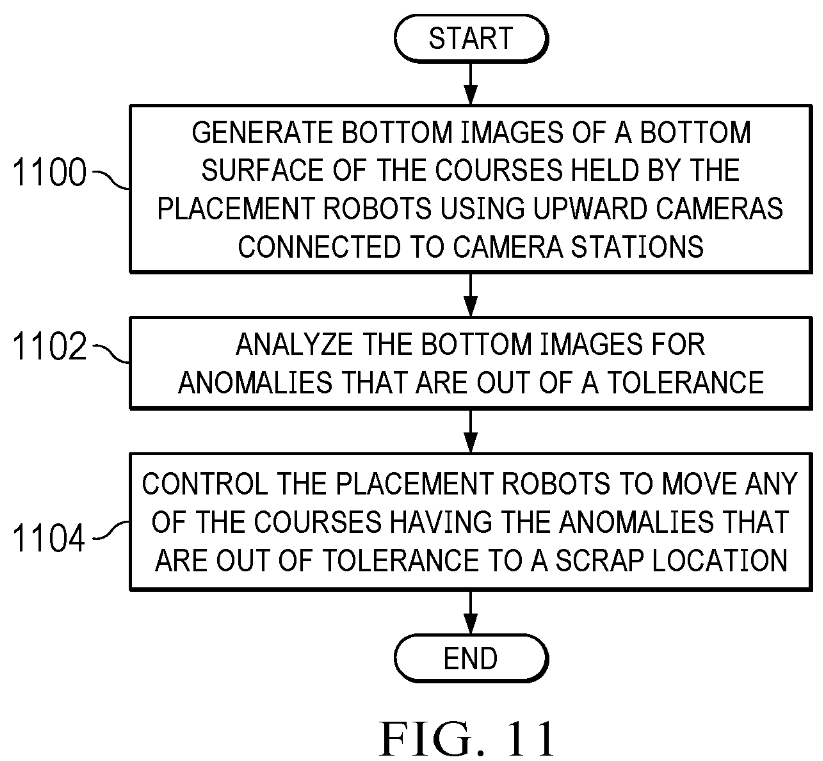
FIG. 11 is an illustration of a flowchart of a process for inspecting courses in accordance with an illustrative embodiment.

Next in FIG. 11, an illustration of a flowchart of a process for inspecting courses is depicted in accordance with an illustrative embodiment. The process in this figure is an example of an additional operation that can be performed with the operations in FIG. 8.

The process generates bottom images of a bottom surface of the courses held by the placement robots using upward cameras connected to camera stations (operation 1100). The process analyzes the bottom images for anomalies that are out of a tolerance (operation 1102).

The process controls the placement robots to move any of the courses having the anomalies that are out of tolerance to a scrap location (operation 1104). The process terminates thereafter.

Figure 12:
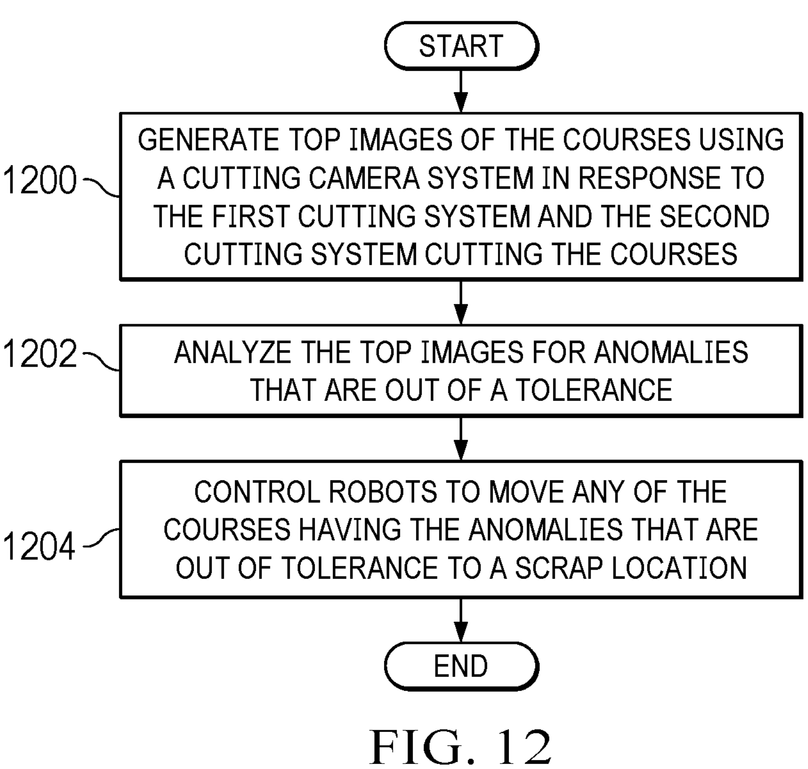
FIG. 12 is an illustration of a flowchart of a process for inspecting courses in accordance with an illustrative embodiment.

Turning to FIG. 12, an illustration of a flowchart of a process for inspecting courses is depicted in accordance with an illustrative embodiment. The process depicted in this flowchart is an example of additional operations that can be performed with the operations in FIG. 8.

The process generates top images of the courses using a cutting camera system in response to the first cutting system and the second cutting system cutting the courses (operation 1200). The process analyzes the top images for anomalies that are out of a tolerance (operation 1202).

The process controls robots to move any of the courses having the anomalies that are out of tolerance to a scrap location (operation 1204). The process terminates thereafter.

In operation 1204, the robots that move the courses with anomalies to its replication can take a number of different forms. For example, these robots can be placement robots. In other illustrative examples, scrap robots are configured to remove courses with anomalies. These scrap robots are separate robots from the placement robots. Scrap robots can be, for example, a robotic arm, a delta arm, a drone, or some other suitable robot.

Figure 13:
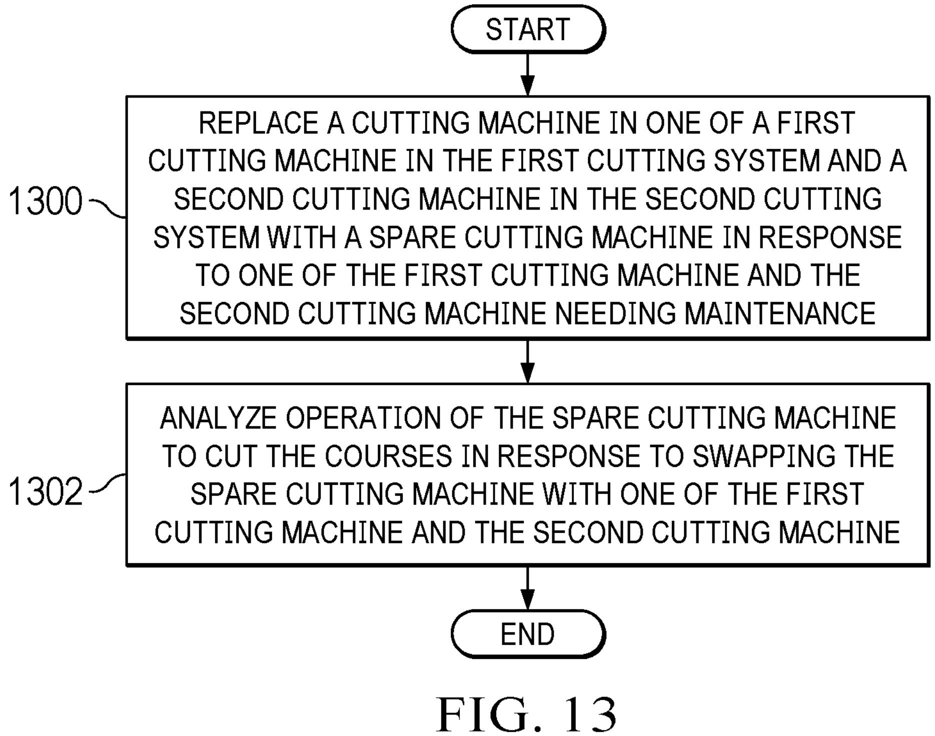
FIG. 13 is an illustration of a flowchart of a process for providing redundancy in a multi-ply lamination system in accordance with an illustrative embodiment.

With reference to FIG. 13, an illustration of a flowchart of a process for providing redundancy in a multi-ply lamination system is depicted in accordance with an illustrative embodiment. The process depicted in this flowchart is an example of additional operations that can be performed with the operations in FIG. 8.

The process replaces a cutting machine in one of a first cutting machine in the first cutting system and a second cutting machine in the second cutting system with a spare cutting machine in response to one of the first cutting machine and the second cutting machine needing maintenance (operation 1300). The process analyzes operation of the spare cutting machine to cut the courses in response to swapping the spare cutting machine with one of the first cutting machine and the second cutting machine (operation 1302). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
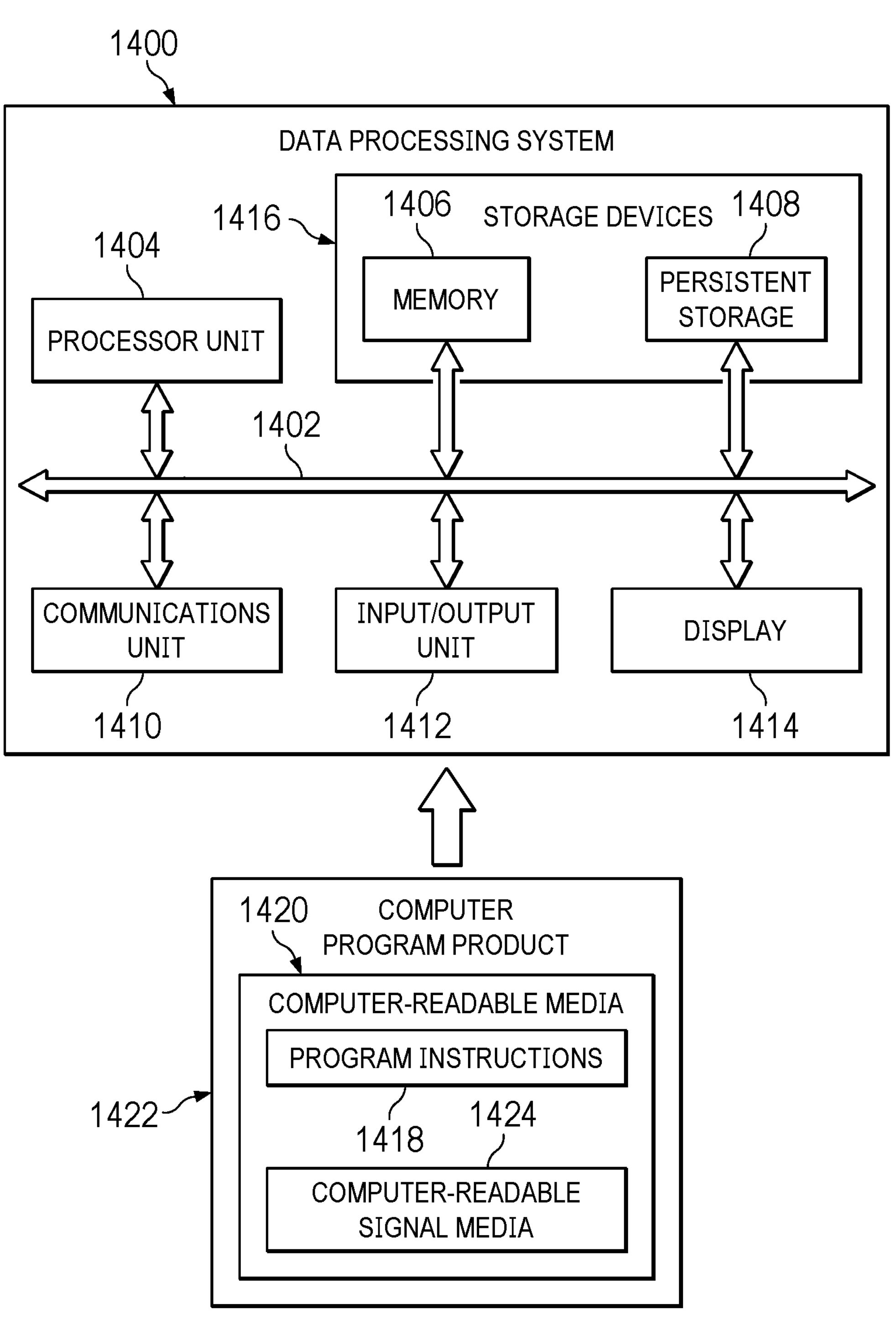
FIG. 14 is an illustration of a block diagram of a data processing system in accordance with an illustrative embodiment.

Turning now to FIG. 14, a block diagram of a data processing system is depicted in accordance with an illustrative embodiment. Data processing system 1400 can be used to implement computer system 112 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer readable program instructions that can be read and executed by a processor in processor unit 1404. The program instructions in the different embodiments can be embodied on different physical or computer readable storage media, such as memory 1406 or persistent storage 1408.

Program instructions 1418 are located in a functional form on computer readable media 1420 that is selectively removable and can be loaded onto or transferred to data processing system 1400 for execution by processor unit 1404. Program instructions 1418 and computer readable media 1420 form computer program product 1422 in these illustrative examples. In the illustrative example, computer readable media 1420 is computer readable storage media 1424.

Computer readable storage media 1424 is a physical or tangible storage device used to store program instructions 1418 rather than a medium that propagates or transmits program instructions 1418. Computer readable storage media 1424 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAN), a read-only memory (ROM), an erasable programmable read-only memory (EPROM or Flash memory), a static random access memory (SPA), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1424, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation, or garbage collection. However, these operations do not render the storage device as transitory because the data is not transitory while the data is stored in the storage device.

Alternatively, program instructions 1418 can be transferred to data processing system 1400 using a computer readable signal media. The computer readable signal media are signals and can be, for example, a propagated data signal containing program instructions 1418. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1420" can be singular or plural. For example, program instructions 1418 can be located in computer readable media 1420 in the form of a single storage device or system. In another example, program instructions 1418 can be located in computer readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer readable media 1420 in a server computer while another portion of program instructions 1418 can be located in computer readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Figures 15, 16:
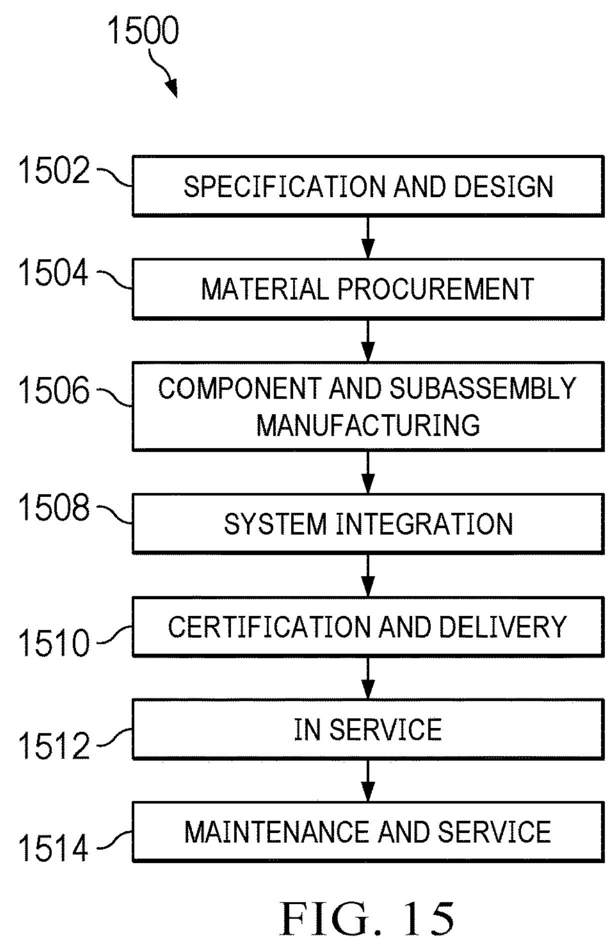
FIG. 15 is an illustration of an aircraft manufacturing and service method in accordance with an illustrative embodiment.
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 can go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 can be fabricated or manufactured in a manner similar to components or subassemblies produced while aircraft 1600 is in service 1512 in FIG. 15. As yet another example, one or more apparatus embodiments, method embodiments, or a combination thereof can be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of aircraft 1600, reduce the cost of aircraft 1600, or both expedite the assembly of aircraft 1600 and reduce the cost of aircraft 1600.

In the illustrative example, the use of multi-ply lamination system 102 in FIG. 1 during at least one of component and subassembly manufacturing 1506 and maintenance and service 1514 can expedite the assembly and maintenance of aircraft 1600. The manner in which courses are cut and placed by multi-ply lamination system 102 to form multi-ply laminates used in forming charges to manufacture composite parts reduces idle time of cutting systems and placement robots within multi-ply lamination system 102 and increases the throughput in placing courses to form plies.

Thus, one or more illustrative examples provide a method, apparatus, system, and computer program product for laying out courses to form plies.

One or more illustrative examples enable increased efficiency in placing courses to form a ply with increased efficiency and speed as compared to current techniques used to lay up courses for composite parts such as those that may be long and narrow. The illustrative examples avoid moving a lamination head many times during a layout process as with current techniques. Further, manual inspections are avoided through the use of cameras to generate images to analyze courses for anomalies that are out of tolerance.

In the illustrative example, simultaneous placement of multiple courses can be performed at the same time using placement robots. Further, swapping of the equipment can be performed to reduce downtime when material loading and other maintenance is needed. In the illustrative examples, a charge lamination process can be reduced from 12 hours to one hour for wing stringers.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A multi-ply lamination system that comprises:

a first cutting system and a second cutting system each configured to independently cut materials having fibers oriented in an initial orientation to form courses and to move the courses into staging positions;

placement robots;

a controller in communication with the first cutting system and the second cutting system and the placement robots, wherein the controller is configured to control:

the first cutting system, wherein the first cutting system is configured to cut and move a first group of the courses into staging positions on a first conveyor;

the placement robots, wherein the placement robots are configured to pick up and place the first group of the courses from the staging positions on the first conveyor to a layup surface to form a first ply of a multi-ply laminate, changing an orientation of the fibers from the initial orientation to a desired orientation for the first ply;

the second cutting system, wherein the second cutting system is configured to cut and move a second group of the courses into the staging positions on a second conveyor while the placement robots are picking up and placing the first group of the courses; and the placement robots, wherein the placement robots are configured to pick up and place the second group of the courses from the staging positions on the second conveyor to the layup surface to form a second ply of the multi-ply laminate, after the first ply has been formed, changing the orientation of the fibers from the initial orientation to the desired orientation for the second ply; and an inspection system configured to perform inspections of the first and second groups of the courses prior to these courses being placed onto the layup surface to determine whether any of the courses have anomalies that are out of a tolerance.

2. The multi-ply lamination system of claim 1 further comprising:

an automated tape layup machine positioned to place a material having fibers in the initial orientation onto the layup surface, wherein the controller is configured to:

control the automated tape layup machine to place the material to form a third ply of the multi-ply laminate with the third ply having the fibers oriented in the initial orientation.

3. The multi-ply lamination system of claim 1, wherein at least one of the first and the second cutting machine is configured to cut the courses from a roll of a material.

4. The multi-ply lamination system of claim 1 further comprising:

a layup conveyor, wherein the layup surface is on the layup conveyor.

5. The multi-ply lamination system of claim 1 further comprising:

a layup table, wherein the layup surface is on the layup table.

6. The multi-ply lamination system of claim 1, wherein the inspection system comprises robot cameras connected to the placement robots, wherein the robot cameras are positioned to generate top images of a top surface of the courses; and wherein the controller is configured to:

generate the top images of the top surface of the courses in response the placement robots moving to pick up the courses;

analyze the top images for the anomalies that are out of the tolerance; and control the placement robots to move any of the courses having the anomalies that are out of the tolerance to a scrap location.

7. The multi-ply lamination system of claim 1, wherein the inspection system comprises upward cameras connected to camera stations, wherein the upward cameras are positioned to generate bottom images of a bottom surface of the courses held by the placement robots, wherein the controller is configured to:

generate the bottom images of the bottom surface of the courses;

analyze the bottom images for the anomalies that are out of the tolerance; and control the placement robots to move any of the courses having the anomalies that are out of the tolerance to a scrap location.

8. The multi-ply lamination system of claim 1, wherein the inspection system comprises a cutting camera system, wherein the cutting camera system is positioned to generate top images of a top surface of the courses cut by the first cutting system and the second cutting system, wherein the controller is configured to:

generate the top images of the courses in response to the first cutting system and the second cutting system cutting the courses;

analyze the top images for the anomalies that are out of the tolerance; and control the placement robots to move any of the courses having the anomalies that are out of the tolerance to a scrap location.

9. The multi-ply lamination system of claim 8 further comprising:

a number of scrap robots positioned to remove the courses cut by the first cutting system and the second cutting system with the anomalies that are out of the tolerance to the scrap location.

10. The multi-ply lamination system of claim 1, wherein the inspection system comprises at least one of a camera system, a thermal camera, an infrared light camera, a visible light camera, a laser scanner, an x-ray imaging machine, and a laser shearography system.

11. The multi-ply lamination system of claim 1 further comprising:

a spare cutting machine, wherein the controller is configured to:

synchronize operation of the spare cutting machine to cut the courses in response to swapping the spare cutting machine with a cutting machine in one of the first cutting system and the second cutting system.

12. The multi-ply lamination system of claim 1, wherein desired orientations for the courses are selected from a group consisting of 15 degrees, 30 degrees, 45, degrees, 75 degrees, and 90 degrees relative to the initial orientation.

13. The multi-ply lamination system of claim 12, wherein a desired orientation for a first ply is different from the desired orientation for a second ply.

14. The multi-ply lamination system of claim 1, wherein the multi-ply laminate is used in a charge that is used to form a part selected from a group consisting of an elongate composite part, a wing stringer, a fuselage stringer, an empennage stringer, a floor beam, a wing spar, and an empennage spar.

15. The multi-ply lamination system of claim 1, wherein the placement robots are configured to change the orientation of the fibers in at least one of the courses by re-orienting a course as it is picked up from a staging position and placed on the layup surface to form a ply;

wherein the ply has a width defined by exterior edges of the ply; and wherein the course is re-oriented so that one or more cut edges of the course forms a part of an exterior edge of the ply when placed on the layup surface.

16. A multi-ply lamination system that comprises:

a first cutting system and a second cutting system each configured to independently cut materials having fibers oriented in an initial orientation to form courses and to move those courses into staging positions on a first conveyor and on a second conveyor;

placement robots;

an automated tape layup machine positioned to place a material having fibers in the initial orientation onto a layup surface;

a controller in communication with the first cutting system, the second cutting system, the placement robots, and the automated tape layup machine, wherein the controller is configured to:

control the first cutting system to cut and move a first group of the courses into the staging positions on the first conveyor;

control the placement robots to pick up and place the first group of the courses from the staging positions on the first conveyor to a layup surface to form a first ply of a multi-ply laminate, changing an orientation of the fibers from the initial orientation to a desired orientation for the first ply;

control the second cutting system to cut and move a second group of the courses into the staging positions on the second conveyor while the placement robots are picking up and placing the first group of the courses;

control the placement robots to pick up and place the second group of the courses from the staging positions on the second conveyor to the layup surface to form a second ply of the multi-ply laminate, after the first ply has been formed, changing the orientation of the fibers from the initial orientation to the desired orientation for the second ply; and control the automated tape layup machine to place the material to form a ply of the multi-ply laminate, with the ply having the fibers oriented in the initial orientation; and an inspection system configured to perform inspections of the first and second groups of the courses prior to these courses being placed onto the layup surface to determine whether any of the courses have anomalies that are out of a tolerance.

17. A method of forming a multi-ply laminate, the method comprising:

controlling a first cutting system to cut and move a first group of courses into staging positions on a first conveyor;

controlling placement robots to pick up and place the first group of courses from the staging positions on the first conveyor to a layup surface to form a first ply of the multi-ply laminate, changing an orientation of fibers from an initial orientation to a desired orientation for the first ply;

controlling a second cutting system to cut and move a second group of courses into staging positions on a second conveyor while the placement robots are picking up and placing the first group of courses;

controlling the placement robots to pick up and place the second group of courses from the staging positions on the second conveyor to the layup surface to form a second ply of the multi-ply laminate after the first ply has been formed, changing the orientation of the fibers from the initial orientation to the desired orientation for the second ply;

controlling an automated tape layup machine to place a material to form a third ply of the multi-ply laminate with the third ply having the fibers oriented in the initial orientation; and controlling an inspection system to perform inspections of the first and second groups of the courses prior to these courses being placed onto the layup surface to determine whether any of the courses have anomalies that are out of a tolerance.

18. The method of claim 17, wherein each subsequent ply is formed by placing at least some of the material of each subsequent ply to at least partially overlap a prior ply.

19. The method of claim 17, wherein the orientation of the fibers in at least one course of the first and second group of courses is changed by re-orienting the course as it is picked up from at least one of the staging positions and placed on the layup surface to form a ply;

wherein the ply has a width defined by exterior edges of the ply; and wherein the course is re-oriented so that one or more cut edges of the course forms a part of an exterior edge of the ply when placed on the layup surface.

20. The method of claim 17 further comprising:

generating top images of a top surface of courses of the first and second group of courses using robot cameras connected to the placement robots in response the placement robots moving to pick up the courses;

analyzing the top images for the anomalies that are out of the tolerance; and controlling the placement robots to move any of the courses having the anomalies that are out of the tolerance to a scrap location.

21. The method of claim 17 further comprising:

generating bottom images of a bottom surface of courses of the first and second group of courses held by the placement robots using upward cameras connected to camera stations;

analyzing the bottom images for the anomalies that are out of the tolerance; and controlling the placement robots to move any of the courses having the anomalies that are out of the tolerance to a scrap location.

22. The method of claim 17 further comprising:

generating top images of courses of the first and second group of courses using a cutting camera system in response to the first cutting system and the second cutting system cutting the courses;

analyzing the top images for the anomalies that are out of the tolerance; and controlling robots to move any of the courses having the anomalies that are out of the tolerance to a scrap location.

23. The method of claim 17 further comprising:

replacing a cutting machine in one of a first cutting machine in the first cutting system and a second cutting machine in the second cutting system with a spare cutting machine in response to one of the first cutting machine and the second cutting machine needing maintenance; and synchronizing operation of the spare cutting machine to cut the courses in response to swapping the spare cutting machine with one of the first cutting machine and the second cutting machine.

* * * * *